(12) United States Patent
Ikeda et al.

(10) Patent No.: US 7,133,370 B2
(45) Date of Patent: Nov. 7, 2006

(54) NETWORK TOPOLOGY COLLECTION DEVICE

(75) Inventors: Kazuya Ikeda, Kawasaki (JP); Katsuichi Ohara, Yokohama (JP); Masanobu Miyamoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 883 days.

(21) Appl. No.: 10/096,782

(22) Filed: Mar. 13, 2002

(65) Prior Publication Data

US 2003/0063571 A1    Apr. 3, 2003

(30) Foreign Application Priority Data

Oct. 2, 2001    (JP) .............................. 2001-306558

(51) Int. Cl.
*H04L 12/28* (2006.01)
(52) U.S. Cl. ...................................... 370/255
(58) Field of Classification Search ........ 370/216–228, 370/231–235, 254–258, 907
See application file for complete search history.

(56) References Cited

U.S. PATENT DOCUMENTS

| | | | | | |
|---|---|---|---|---|---|
| 5,513,171 | A | * | 4/1996 | Ludwiczak et al. | 370/254 |
| 5,568,605 | A | * | 10/1996 | Clouston et al. | 714/4 |
| 5,781,537 | A | * | 7/1998 | Ramaswami et al. | 370/254 |
| 6,178,172 | B1 | * | 1/2001 | Rochberger | 370/395.32 |
| 6,614,785 | B1 | * | 9/2003 | Huai et al. | 370/352 |
| 6,654,802 | B1 | * | 11/2003 | Oliva et al. | 709/224 |
| 6,925,494 | B1 | * | 8/2005 | Nisbet | 709/223 |
| 6,981,065 | B1 | * | 12/2005 | Lu | 709/251 |

FOREIGN PATENT DOCUMENTS

| | | |
|---|---|---|
| JP | 60-259036 | 12/1985 |
| JP | 63-082039 | 4/1988 |
| JP | 63-234753 | 9/1988 |
| JP | 5-252158 | 9/1993 |
| JP | 2000-004227 | 1/2000 |
| JP | 2000-252941 | 9/2000 |

OTHER PUBLICATIONS

IEEE Dictionary of IEEE standards terms. Seventh edition. IEEE, 2000, p. 1190.*
Notification of Reason(s) for Refusal dated Dec. 13, 2005.

* cited by examiner

*Primary Examiner*—Dmitry Levitan
(74) *Attorney, Agent, or Firm*—Katten Muchin Rosenman LLP

(57) ABSTRACT

A network topology collection device determining a network topology which indicates a connection state of a route prepares opposed topology information which indicates the connection state between a collection node to which the network topology collection device itself belongs and opposed nodes which respectively terminate routes terminated by the collection node, collects opposed topology information of a node directly or indirectly routed to the collection node, and determines a topology of an entire network based on the opposed topology information collected. Also, in a hierarchized route, the collection device determines a network topology of a route in a specific hierarchy based on opposed topology information in the hierarchy and opposed topology information of a route in another hierarchy.

18 Claims, 27 Drawing Sheets

$E_1 \sim E_5$ : NODE IDENTIFIER
$S_1 \sim S_3$ : ROUTE EDGE IDENTIFIER

FIG.18
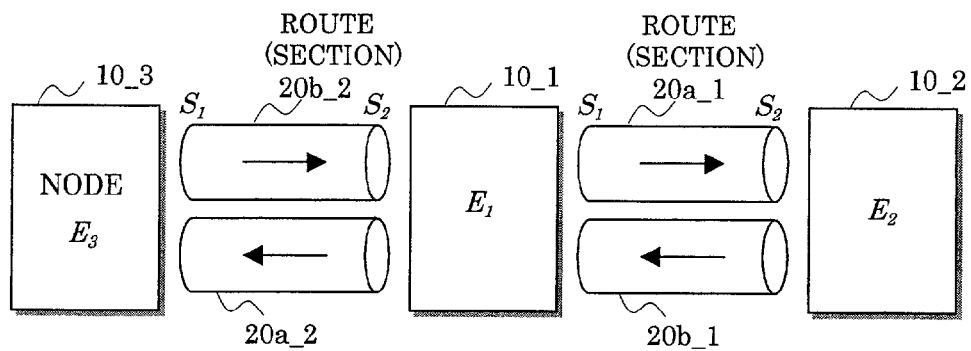
FIG.19A DEMAND PACKET 71 | HEADER | REQUEST |
FIG.19B RESPONSE PACKET 72 | HEADER | $E_i$ | $S_i$ |
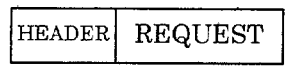
70 ROUTE CONNECTION STATE INFORMATION
FIG.20A SECTION DATA 81 | $E_i$ | $S_i$ | $E_j$ | $S_j$ |
FIG.20B CONNECT DATA 83 | $E_i$ | $S_i$ | $P_i$ | $S_j$ | $P_j$ |

FIG.21B  DEMAND PACKET ⟶ [HEADER | REQUEST] 71_1

FIG.21C  [HEADER | $E_2$ | $S_2$] ⟵ RESPONSE PACKET   72_1, 70_1

FIG.21D  SECTION DATA  [$E_1$ | $S_1$ | $E_2$ | $S_2$]  81_1

FIG.21E  [HEADER | REQUEST] ⟵ DEMAND PACKET  71_2

FIG.21F  RESPONSE PACKET ⟶ [HEADER | $E_3$ | $S_1$]  72_2, 70_2

FIG.21G  SECTION DATA  [$E_1$ | $S_2$ | $E_3$ | $S_1$]  81_2

FIG.21H  CONNECT DATA  [$E_1$ | $S_1$ | $P_2$ | $S_2$ | $P_1$]  83_1

FIG.21I  CONNECT DATA  [$E_1$ | $S_1$ | $P_3$ | — | $P_4$]  83_2

FIG.29A
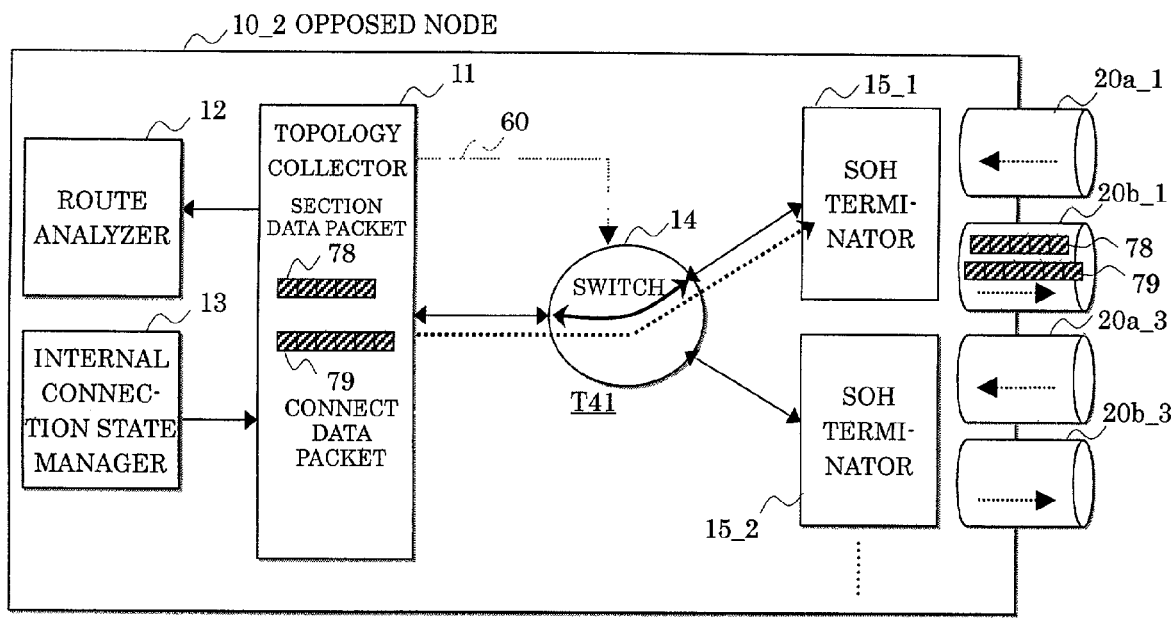
FIG.29B FORMAT OF SECTION DATA PACKET 78
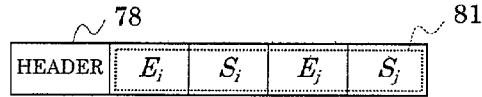
FIG.29C FORMAT OF CONNECT DATA PACKET 79
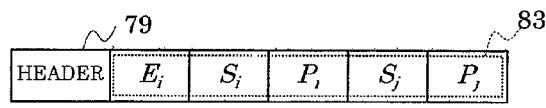

NETWORK TOPOLOGY COLLECTION DEVICE

BACKGROUND OF THE INVENTION

1. Field of the Invention

The present invention relates to a network topology collection device, and in particular to a network topology collection device for determining a network topology which indicates a connection state of a route.

Recently, with a rapid advancement of a communication technology and a growing demand for communication, the number of nodes (transmission devices) and routes (links) which compose a network has been increasing, a communication rate has been enhanced, the routes in the network have been hierarchized (multiplexed), and a network topology has been complicated.

In such a complicated network, recognition (determination) of a network topology when the nodes and routes are added/changed/removed at the time of a network construction or after the construction has been more and more important for enhancing the reliability of communication.

2. Description of the Related Art

Recognition of the prior art network topology such as a recognition of a connection state after a network construction in an SDH/SONET trunk transmission system requires verifications based on network composition data, which much rely on manual works, resulting in a possibility of wrong network construction.

In order to solve this problem, "Generation method of network composition data and network system using the same" disclosed in the Japanese Patent Application Laid-open No.2000-4227 has proposed a method/system for performing verifying works in real time.

The method and system are characterized in that transmission information carried by transmission part information added thereto is transmitted between interfaces of transmission devices (nodes) mutually connected, the transmission part information received on the reception side and reception part information which receives the transmission part information are stored, and the stored transmission part information and the reception part information are combined to be outputted as device information required from a processor connected to the outside of the transmission device.

When the method and the system are applied to an SDH/SONET network, for example, a connection state of a section can be collected since the collected network composition data are an aggregation of pairs of the transmission part information and the reception part information. However, a connection state of a line and a path may not be collected. Namely, in this method and system, there is a problem that only a network topology of a section within a route where a section, a line, and a path are hierarchized ("multiplexed" in the SDH/SONET network) can be recognized.

Also, the processor is connected to the outside of the transmission device with another transmission line different from one through which communication service information passes. The network composition data are collected through this different transmission line. Accordingly, there is a problem as follows: When the different transmission line through which the network composition data pass is abnormal, the processor can not properly collect the network composition data. Therefore, although the transmission line through which the communication service information passes is normal, the topology of the network composed of the normal transmission line and the transmission device can not be determined.

Furthermore, since the network composition data are collected in real time in the method and the system, the transmission device is always required to keep transmitting the transmission part information and to keep transmitting the network composition data to the processor. The processor is always required to update the network composition data, and to determine the network topology. Accordingly, there is a problem that information transmitted/received between the transmission devices and between the transmission device and the processor is increased, thereby complicating the processing of the processor.

SUMMARY OF THE INVENTION

It is accordingly an object of the present invention to provide a network topology collection device which determines a network topology indicating a connection state of a route and which enables the network topology accurately corresponding to the network to be easily determined when required. Specifically, it is an object to determine the network topology indicating the connection state of the network based on information collected by using a transmission line of communication service, to determine the network topology of a hierarchized route, to decrease information amount transmitted/received and processed, and to make processing for determining the network topology easy.

In order to achieve the above-mentioned object, a network topology collection device according to the present invention comprises: first means for demanding, from an opposed node which terminates a route terminated by a node to which the network topology collection device itself belongs, route connection state information indicating a connection state with the route, and for preparing opposed topology information based on responded route connection state information; and second means for collecting opposed topology information of a node directly or indirectly routed to the node to which the network topology collection device itself belongs.

FIGS. 1A–1C show a principle (1) of the present invention. The network topology collection device (not shown) of the present invention is included in a node 10_1 (hereinafter, occasionally referred to as collection node) collecting a network topology. In FIGS. 1A–1C, an SDH/SONET network is shown as an example of the network and a section is shown as an example of the route.

In the SDH/SONET network, nodes are bidirectionally connected with a transmitting route (section) and a receiving route corresponding to each other one-on-one, and the routes are terminated by the nodes.

In FIG. 1A, the collection node 10_1 collecting the network topology is connected to a node 10_2 opposed to the node 10_1 with a transmitting section 20a and a receiving section 20b as seen from the collection node 10_1. Hereinafter, a pair of transmitting section 20a and receiving section 20b is regarded as a single section and is generally represented by a section 20, and is occasionally shown by a single pattern (line or cylinder).

FIG. 1B shows a network example in which the collection node 10_1 is connected to the opposed node 10_2 with two sections 20_1 (sections 20a_1 and 20b_1) and 20_2 (sections 20a_2 and 20b_2). FIG. 1C shows a network example in which the collection node 10_1 is connected to a plurality of nodes 10_2, 10_3, and 10_4 opposed to the node 10_1 with sections 20_1, 20_2, and 20_3 (hereinafter, occasionally represented by a reference numeral 20).

In FIG. 1C, the first means of the network topology collection device in the collection node 10_1 transmit, through the sections 20a_1–20a_3, demand signals 71_1–71_3 which demand route connection state information indicating a connection state with the section 20 to the opposed nodes 10_2–10_4 which respectively terminate the sections (routes) 20_1–20_3 terminated by the node 10_1 to which the network topology collection device itself belongs.

The nodes 10_2–10_4 respectively return response signals 72_1–72_3 including the route connection state information therein to the node 10_1 through the sections 20b_1–20b_3.

The first means prepare, based on all of the route connection state information received, opposed topology information which aggregates route information composed of the node 10_1 to which the network topology collection device itself belongs, the route (section) terminated by the node 10_1, and the opposed node 10 which terminates the other end of the route.

The second means demand the opposed topology information of the nodes directly connected to the node to which the network topology collection device itself belongs with the route, i.e. the opposed nodes 10_2–10_4, and the nodes (not shown) indirectly connected through the nodes 10_2–10_4.

The first means of the nodes 10 having received the demand prepare the opposed topology information in the same way as the collection node 10_1 to be returned to the collection node 10_1.

Thus, it becomes possible to acquire the opposed topology information of all of the nodes composing the network.

Similarly, in the network shown in FIGS. 1A and 1B, the collection node 10_1 can prepare the opposed topology information of its own and can collect the other opposed topology information.

It is to be noted that in a redundant network where the nodes 10_1 and 10_2 shown in FIG. 1B are connected with two sections 20_1 and 20_2, the collection node 10_1 demands the route connection state information respectively through the sections 20_1 and 20_2, thereby enabling the opposed topology information including the connection state of the sections 20_1 and 20_2 to be prepared.

Also, the present invention according to the above-mentioned invention may further comprise an internal connection state manager for managing internal connection state information indicating the connection state of the route within the node to which the network topology collection device itself belongs, and the second means may collect the opposed topology information further including internal connection state information within the node directly or indirectly routed to the node to which the network topology collection device itself belongs.

FIG. 2 is a diagram for describing a principle (2) of the present invention, and shows a route connection state within the node. As a route example, paths 40a_1–40a_5, . . . , 40b_1–40b_5, . . . (hereinafter, occasionally represented by a reference numeral 40) in the SDH/SONET network are shown. It is to be noted that the paths 40a_1–40a_5, . . . and the paths 40b_1–40b_5, . . . are respectively connected bidirectionally corresponding to each other one-on-one.

An internal connection state manager (not shown) manages the internal connection state information indicating the connection state of the path 40 within the node 10 to which the network topology collection device itself belongs.

The second means collect, as the opposed topology information, the opposed topology information further including the internal connection state information within the other nodes opposed to the node 10.

Thus, it becomes possible to determine the network topology of the route passing through the nodes.

Also, in the present invention according to the above-mentioned invention, the route may be hierarchized, and the first means may prepare opposed topology information corresponding to a route in at least one hierarchy at the node to which the network topology collection device itself belongs, and the second means may collect opposed topology information corresponding to the route in at least one hierarchy.

FIG. 3 is a diagram for describing a principle (3) of the present invention, which shows a hierarchized route, e.g. an example of the hierarchized route in the SDH/SONET network. In the route connecting the nodes 10_1 and 10_2, the section 20a, a line 30a, the paths 40a (ch1)–40a_n (chn), the section 20b, a line 30b, and the paths 40b (ch1)–40b_n (chn) are hierarchized.

In the principle (1) of the present invention shown in FIGS. 1A–1C, it is described that the network topology collection device collects the opposed topology information of the section in case where the route is a section in the SDH/SONET network.

It becomes possible for the network topology collection device to further acquire the opposed topology information of the line and the path with a node to which the network topology collection device itself belongs being made a collection node, and to collect the opposed topology information of the line and the path of other nodes.

Also, the present invention according to the above-mentioned invention may further comprise a route analyzer for determining a topology of an entire network based on the opposed topology information.

Namely, a route analyzer can determine the topology of the entire network based on the opposed topology information collected from the nodes composing the network.

Also, in the present invention according to the above-mentioned invention, the route analyzer may determine a network topology of a route in a specific hierarchy based on opposed topology information in the hierarchy and opposed topology information of a route in another hierarchy.

FIG. 4 is a diagram for describing a principle (4) of the present invention, which shows a section 20 and a line 30 in the SDH/SONET network. The lines 30_1 and 30_3 always have sections 20_1 and 20_3 respectively corresponding to the lines. Also, when e.g. the nodes 10_1, 10_2, and 10_4 are not a regenerator, the lines 30_1 and 30_3 are terminated by the nodes 10_1, 10_2, and 10_4.

Accordingly, the network topology of the line 30 is the same as that of the section 20.

Namely, the route analyzer can determine the network topology of the route (e.g. line) in the specific hierarchy based on the opposed topology information of the line and the opposed topology information of the route (e.g. section) in another hierarchy.

By using the opposed topology information of the route in another hierarchy, the route analyzer can determine the network topology with less opposed topology information amount of the route in the specific hierarchy.

Also, in the present invention according to the above-mentioned invention, in presence of a node which does not terminate the route in the specific hierarchy, the route analyzer may determine the topology of the route in the specific hierarchy based on opposed topology information of the route in another hierarchy included in the route in the specific hierarchy.

FIG. 5 shows a principle (5) of the present invention, which shows a case where the node 10_2 in FIG. 4 is a regenerator and the line 30_1 is not terminated by the node 10_2.

When it is recognized that the node 10_2 is a regenerator, it is determined that the line 30_1 whose one edge is connected to the node 10_1 is not terminated by the node 10_2, and that the line 30_1' (=line 30_1) whose one edge is connected to the node 10_4 is not terminated by the node 10_2. Also, it is recognized from the path connection state within the node 10_2 that the lines 30_1 (30_1') are connected with the node 10_2.

Namely, in the presence of a node which does not terminate a route (e.g. line) in a specific hierarchy, the route analyzer determines the line topology based on the opposed topology information (internal connection state information 84) of the route (e.g. path) in another hierarchy included in the route (line) in the specific hierarchy.

Also, in the present invention according to the above-mentioned invention, the route analyzer may determine the topology of the route in the specific hierarchy based on internal connection state information of the route in the specific hierarchy and opposed topology information of a route in a hierarchy including the route in the specific hierarchy.

A principle (6) of the present invention in FIG. 6 shows a determination example of the network topology of the path. In this example, the network topology of the path is determined by combining the internal connection state information 84 of the path in the node 10_2 with the connection state of the path between the nodes recognized from the opposed topology information (connection state of the sections 20_1 and 20_3) 82 of the section.

Also, in the present invention according to the above-mentioned invention, the internal connection state information may comprise internal connection state information of a virtual route in the specific hierarchy.

A principle (7) of the present invention in FIG. 7 shows a case where the node 10_2 is a regenerator. It is possible to determine the network topology of the path in the same way as the case of FIG. 6 by converting the connection state of the virtual path within the node 10_2 into data of the internal connection state information 84.

A principle (8) of the present invention in FIG. 8 shows an example of a network topology determination in case where the node 10_2 is a node incapable of performing a path route changeover in FIG. 6. Also in this case, it is possible to determine the network topology of the path based on the internal connection state information 84 of the virtual path within the node 10_2.

Also, in the present invention according to the above-mentioned invention, the internal connection state manager may determine the internal connection state information based on a function of each node.

FIGS. 9A and 9B show a principle (9) of the present invention. The node 10 includes a node which does not terminate the line, as shown in FIG. 9A, and is called a regenerator. The paths 40a_1–40a_n and 40b_1–40b_n respectively included in such lines 30a_1 and 30b_1 are supposed to have a virtual internal connection state.

Also, there is a node which can not change over the route (path) as shown in FIG. 9B. The paths 40a_1–40a_n and 40b_1–40b_n are supposed to have a virtual internal connection state.

Namely, the internal connection state manager can determine the internal connection state information of the route (path in the above-mentioned example) based on a function of the node.

It is to be noted that in the description of the above-mentioned principles (7) and (8) of FIGS. 8 and 9, the network topology is determined by using this virtual internal connection state information.

Also, in the present invention according to the above-mentioned invention, the node may have a switch, and the second means may transmit a switch control signal for switching over the switch of the node to which the network topology collection device itself belongs, a relay node, or a collecting destination node, and may establish a transmission line of the opposed topology information.

FIG. 10 shows an arrangement of the node 10, which is composed of a network topology collection device 100 of the present invention, a switch 14, and an SOH terminator 15 corresponding to a route (section 20 in FIG. 10).

It is possible to mutually connect the second means included in the network topology collection device 100 of the present invention and the route (terminator), or the routes (terminators) with a switch control signal 60 through the switch 14.

The second means can establish a transmission line of the information by transmitting the switch control signal which changes over the switch 14 of the node to which the network topology collection device itself belongs, the relay node if it exists, or the node of the collecting destination.

Namely, when transmitting a signal for demanding e.g. the opposed topology information to the collecting destination node, the second means transmit to the nodes a switch changeover signal for changing over the switch of its own node as a collecting source, the switch of the collecting destination node by which the opposed topology information is collected, and the switch of the relay node if it exists.

Based on this switch changeover signal, the switches of the nodes are changed over and a static switching route is set up between the network topology collection device 100 and the SOH terminator 15, or between the SOH terminators 15 to establish a transmission line.

Thus, it becomes possible for the network topology collection device to establish a static transmission line between the collection device itself and a network topology collection device of nodes except the node to which the network topology collection device itself belongs.

Also, in the present invention according to the above-mentioned invention, the information transmitted/received between the nodes may be transmitted through the route.

Namely, information demanding the route connection stare information, the route connection state information, information demanding the opposed topology information, the opposed topology information, switch changeover information, or the like, for example, is transmitted through the route composing the network topology, i.e. the route for communication service information.

Thus, by using another route, the problem caused by a fault of another route can be eliminated that the network topology can not be determined although the route for the communication service information is normal.

Also, in the present invention according to the above-mentioned invention, the second means may recognize a node connected to a network based on the opposed topology information collected, and may repeat a collection of opposed topology information until any of recognized nodes collects opposed topology information.

Namely, the second means execute the following protocol.

(1) The second means recognize the nodes connected to the network based on the collected opposed topology information. Namely, the nodes included in the collected all of the opposed topology information are nodes connected to the network.

However, there is a possibility that another node is further connected to the node which does not collect the opposed topology information within the nodes connected to the network.

(2) Therefore, the second means collect the opposed topology information from the node which does not collect the opposed topology information to return to the above-mentioned (1). This is repeated until any node collects the opposed topology information, thereby enabling all of the nodes connected to the network to be determined.

Hereinafter, the collection procedure of the opposed topology information by the above-mentioned protocol will be more intelligibly described based on a network 200 shown in FIG. 11.

The network 200 in FIG. 11 is composed of nodes 10_1–10_5 and routes (sections) 20_1–20_5. The nodes 10_2 and 10_3 are connected to the node 10_1 respectively with the sections 20_1 and 20_2. The node 10_4 is connected to the node 10_2 with the section 20_3, and the nodes 10_4 and 10_5 are connected to the node 10_3 respectively with the sections 20_4 and 20_5.

FIGS. 12–16 show collection procedures (1)–(5) of the opposed topology information by the above-mentioned protocol, and especially show the case where the node 10_1 is one collecting the network topology.

In the procedure (1) of FIG. 12, the network topology collection device (not shown) of the collection node 10_1 (shown by hatching) collects the route collection state information of the sections 20_1 and 20_2 up to the opposed nodes 10_2 and 10_3, prepares the opposed topology information based on the route collection state information, and acquires the internal connection state information indicating the internal route connection state of the node 10_1.

Thus, the node 10_1 recognizes the existence of the nodes 10_2 and 10_3, and at least one route (section) to the nodes.

In the procedure (2) of FIG. 13, the collection device establishes a transmission line 50_1 from the node 10_1 to the node 10_2, and requests, from the node 10_2, the collection of the opposed topology information of the route (e.g. section) up to the node 10 opposed to the node 10_2 and the acquisition of the internal connection state information indicating the connection state of the route (e.g. path) within the node 10_2. The node 10_2 transmits the opposed topology information and the internal connection state information to the node 10_1.

Thus, the node 10_1 recognizes the existences of the node 10_4 and the route to the node 10_4.

In the procedure (3) of FIG. 14, the collection device requests the same operation requested to the node 10_2 from the node 10_3. The node 10_3 returns the opposed topology information and the internal connection state information of the node 10_3 to the node 10_1. Thus, the node 10_1 recognizes the existence of the node 10_5 and the route to the node 10_5.

In the procedure (4) of FIG. 15, the collection device establishes a transmission line 50_3 through the node 10_2 between the nodes 10_1 and 10_4, and requests the opposed topology information and the internal connection state information of the node 10_4 from the node 10_4 to acquire the same.

In the procedure (5) of FIG. 16, the collection device similarly establishes a transmission line 50_4 through the node 10_3, and acquires the opposed topology information and the internal connection state information of the node 10_5.

Thus, the collection device acknowledges the opposed topology information and the internal connection state information of all of the node 10_1 to which the network topology collecting device itself belongs and the other nodes 10_2–10_5 composing the network. Namely, the collection device acquires the network topology of the route.

It is to be noted that since an acquisition processing of the connection state is performed from both sides for a single route at this time, there are twice as many as data describing the same section in the data acquired by the collection device of the node 10_1. Therefore, the data of the section opposed topology information in which only the connecting source and the connecting destination are exchanged are regarded identical, so that only one side of the data is stored, thereby reducing the data amount collected by the node 10_1.

Also, in the present invention according to the above-mentioned invention, the node and the route may compose an SDH/SONET network, and the second means may establish the transmission line by using an unused area of a section overhead of an SDH/SONET.

Also, in the present invention according to the above mentioned invention, the route connection state information may comprise an identifier of the opposed node and an identifier of an edge of the opposed node side of the route, and the opposed topology information may comprise an aggregation aggregating route data, composed of identifiers of both edges of a route and identifiers of nodes which respectively terminate the both edges, for all of the routes terminated by the node to which the network topology collection device itself belongs.

Also, in the present invention according to the above-mentioned invention, the internal connection state information may comprise an aggregation aggregating route connect data, for all pairs of a first and a second route connected within the node, composed of an identifier of a node, identifiers of a first and a second route connected within the node, and identifiers of a third and a fourth route including the first and the second route.

BRIEF DESCRIPTION OF THE DRAWINGS

FIG. 18 is a block diagram showing an identifier example of a network element used in a network topology collection device according to the present invention;

FIGS. 19A and 19B are diagrams showing a format example of a packet exchanged between network topology collection devices according to the present invention;

FIGS. 20A and 20B are diagrams showing a format example of section data acquired by a network topology collection device according to the present invention and connect data prepared by the same;

FIGS. 21A–21I are sequence diagrams showing an acquisition procedure example of data in a network topology collection device according to the present invention;

FIGS. 29A–29C are sequence diagrams showing an example of an opposed topology information (section data and connect data) acquisition procedure (5) of an opposed node in a network topology collection device according to the present invention;

Throughout the figures, like reference numerals indicate like or corresponding components.

DESCRIPTION OF THE EMBODIMENTS

Figure 17:
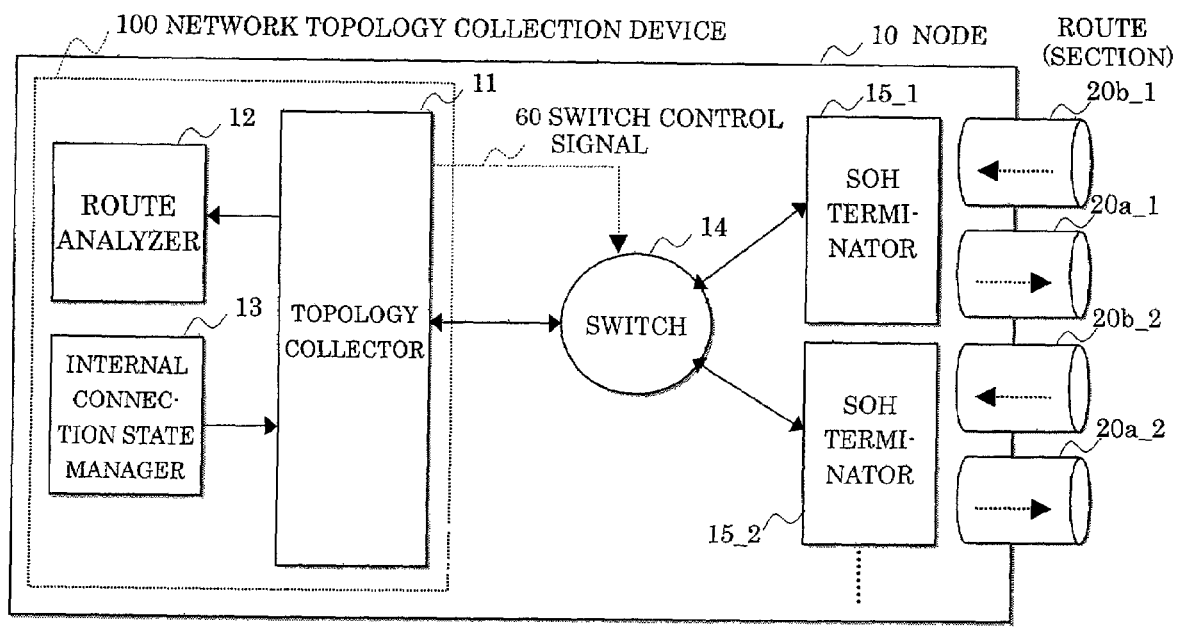
FIG. 17 is a block diagram showing an embodiment of a network topology collection device according to the present invention.

FIG. 17 shows an embodiment of the network topology collection device 100 according to the present invention. This collection device 100 is composed of a topology collector 11, a route analyzer 12, and an internal connection state manager 13, and is installed within the node 10.

In this embodiment, the node 10 corresponds to the SDH/SONET network, and is provided with a switch 14 connected to the topology collector 11 and section overhead terminators (hereinafter, occasionally abbreviated as SOH terminators) 15_1, 15_2, . . . (hereinafter, occasionally represented by a reference numeral 15).

The SOH terminators 15 respectively terminate the sections 20_1 (indicating a pair of sections 20a_1 and 20b_1, the same applied to the followings), 20_2, . . . (hereinafter, occasionally represented by a reference numeral 20).

The switch 14 dynamically switches over a packet transmitted/received between the SOH terminators 15. The topology collector 11 can set a static switch, within the switch 14, which connects the SOH terminators 15 or the SOH terminator 15 to the topology collector 11.

The topology collector 11 has the first means of demanding route connection state information 70 (see FIG. 19B) indicating the connection state with the section from the opposed node 10 which terminates the section 20 terminated by each SOH terminator 15, and of preparing opposed topology information 82 which is an aggregation of section data 81 (see FIG. 20A) corresponding to each section prepared based on the responded route connection state information 70.

Furthermore, the topology collector 11 is provided with the second means of collecting the opposed topology information 82 of the node directly or indirectly connected to the node 10_1 with the section.

Hereinafter, an operation will be described in case where the network topology collection device 100 of the present invention is installed in the nodes 10_1–10_5 and the collection device 100 of the node 10_1 collects the network topology in the SDH/SONET network 200 composed of the nodes 10 and sections 20 shown in FIG. 11.

The identifiers of the nodes and the sections used for describing the operation, the formats of the packets and the data, and the basic collection procedure of the data will be described referring to FIGS. 18–21.

FIG. 18 shows identifiers set to the nodes 10 and the sections 20. The nodes 10 of the SDH/SONET network have information of a value and a serial No. indicating a function (LTE terminator, generator, or the like) of the nodes 10, a name given by an operator, or the like.

Based on the information, an identifier $E_i$ is automatically set to the nodes 10 within the network in order to uniquely identify the nodes. Also, an identifier $S_i$ is set to the edges of all the sections 20 terminated by the nodes 10 in order to uniquely identify the edges. However, the identifier $S_i$ is arbitrarily provided to each node 10, and the identifier $S_i$ of different nodes 10 may be the same identifier.

Identifier $E_1$–$E_3$ are respectively set to the nodes 10_1–10_3 shown in FIG. 18, an identifier $S_1$ is set to the edge of the node 10_1's side of the section 20_1 (a pair of sections 20a_1 and 20b_1), and an identifier $S_2$ is set to the edge of the node 10_2's side of the section 20_1. The identifier $S_2$ is set to the edge of the node 10_1's side of the section 20_2 (a pair of sections 20a_2 and 20b_2), and the identifier $S_1$ is set to the edge of the node 10_3's side of the section 20_2.

FIG. 19A shows a demand packet (demand signal) 71 transmitted from the collection node 10 to the opposed node 10. FIG. 19B shows a response packet (route connection state information 70) 72 responded by the opposed node 10 for the demand packet 71.

The demand packet 71 is composed of a header and data indicating the demand packet. The response packet 72 is composed of a header and the route connection state information 70, which is composed of the identifier $E_i$ of the opposed node per se and the identifier $S_i$ of the opposed node side of the section having received the demand packet 71.

The node 10_2 shown in FIG. 18, for example, returns the response packet 72 in which the data="$E_2$"+"$S_2$" as a response to the demand packet 71 received from the node 10_1 through the section 20a_1.

FIGS. 20A and 20B respectively show formats of the section data 81 and the connect data 83.

The section data 81 are prepared for each section 20 in the collection node 10. The format of the section data 81, as shown in FIG. 20A, is composed of the identifier $E_i$ of the collection node 10, the identifier $S_i$ of one edge of the section 20 terminated by the collection node 10, an identifier $E_j$ which terminates another edge of the section 20, and an identifier $S_j$ of another edge of the section 20.

The connect data 83 indicate the connection state of two paths 40 within the nodes 10, and are prepared for each pair of paths 40 connected at the nodes 10. The paths 40 are included in the sections 20 and the lines 30, and a channel No. $P_i$ is set as the identifier.

In the format of the connect data 83, as shown in FIG. 20B, the identifier $E_i$ of the node 10, the identifier $P_i$ of the path 40 on one side, the identifier $S_i$ of the section 20 including the path 40 on the concerned node 10's side, an identifier $P_j$ of the path on the other side, and the identifier $S_j$ of the section 20 including the path on the concerned node 10's side are arranged in the order of $E_i$, $S_i$, $P_i$, $S_j$, and $P_j$.

FIGS. 21A–21I show a procedure that the network topology collection device (not shown) in the collection node 10_1 demands the route (section) connection state information 70 from the opposed nodes 10_2 and 10_3, and prepares the section data 81 based on the responded state information 70, and show an example of the connect data 83 prepared within the network topology collection device.

Figure 21A:
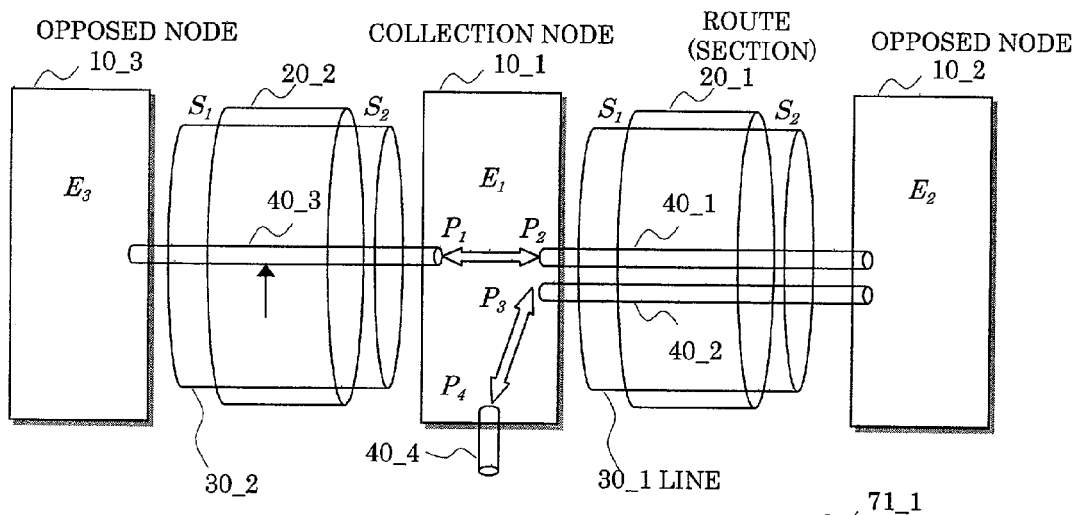

FIG. 21A shows a connection state of the collection node 10_1 and the opposed nodes 10_2 and 10_3. The edges $S_1$ and $S_2$ of the section 20_1 are respectively terminated by the collection node 10_1 and the opposed node 10_2, and the edges $S_2$ and $S_1$ of the section 20_2 are respectively terminated by the collection node 10_1 and the opposed node 10_3.

Within the collection node 10_1, a path of a channel No. $P_2$ included in the section 20_1 is connected to the path of the channel No. $P_1$ included in the section 20_2. A path of a channel No. $P_3$ included in the section 20_1 is connected to a path of a channel No. $P_4$ terminated.

FIG. 21B shows a demand packet 71_1 which the collection node 10_1 transmits to the opposed node 10_2 through the section 20_1 (see FIG. 19A). FIG. 21C shows a response packet 72_1 which the opposed node 10_2 returns (see FIG. 19B).

The data of the response packet 72_1 are route connection state information 70_1 composed of the identifier $E_2$ of the opposed node 10_2 and the identifier $S_2$ of the edge of the opposed node 10_2's side of the section 20_1.

FIG. 21D shows section data 81_1 concerning the section 20_1 prepared by the collection node 10_1, which are composed of the identifier $E_1$ of the collection node 10_1, the identifier $S_1$ of the collection node 10_1's side of the section 20_1, the identifier $E_2$ of the opposed node 10_2, and the identifier $S_2$ of the other edge of the section 20_1 (see FIG. 20A).

Similarly, the collection node 10_1 transmits a demand packet 71_2 shown in FIG. 21E to the opposed node 10_3 through the section 20_2, receives a response packet 72_2 shown in FIG. 21F, and prepares section data 81_2 concerning the section 20_2 shown in FIG. 21G based on the response packet 72_2. The aggregation of the section data 81_1 and 81_2 is the section opposed topology information 82.

FIG. 21H shows connect data 83_1 indicating that paths 40_1 and 40_3 respectively prepared by the collection node 10_1 are connected. FIG. 21I shows connect data 83_2 indicating that paths 40_2 and 40_4 are connected (see FIG. 20B). The aggregation of the connect data 83_1 and 83_2 is the internal connection state information 84.

It is to be noted that since the path 40_4 is terminated, the identifier of the edge of the section corresponding to the path 40_4 ($P_4$) is indicated by "—".

Figure 22:
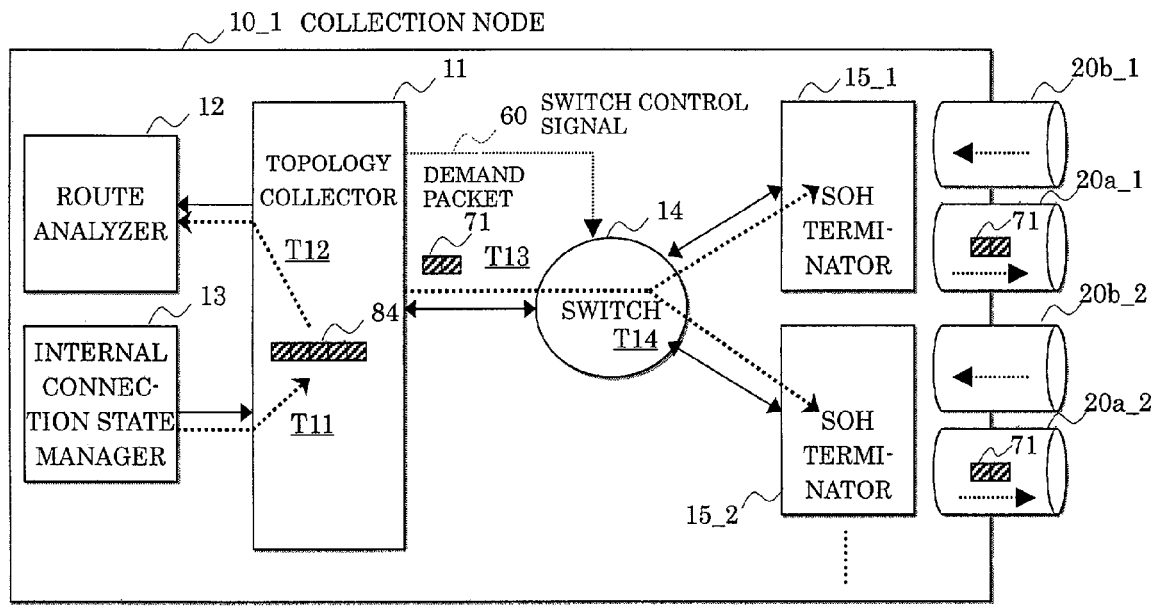
FIG. 22 is a sequence diagram showing an example of an opposed topology information (section data and connect data) acquisition procedure (1) of a collection node in a network topology collection device according to the present invention.
Figure 23:
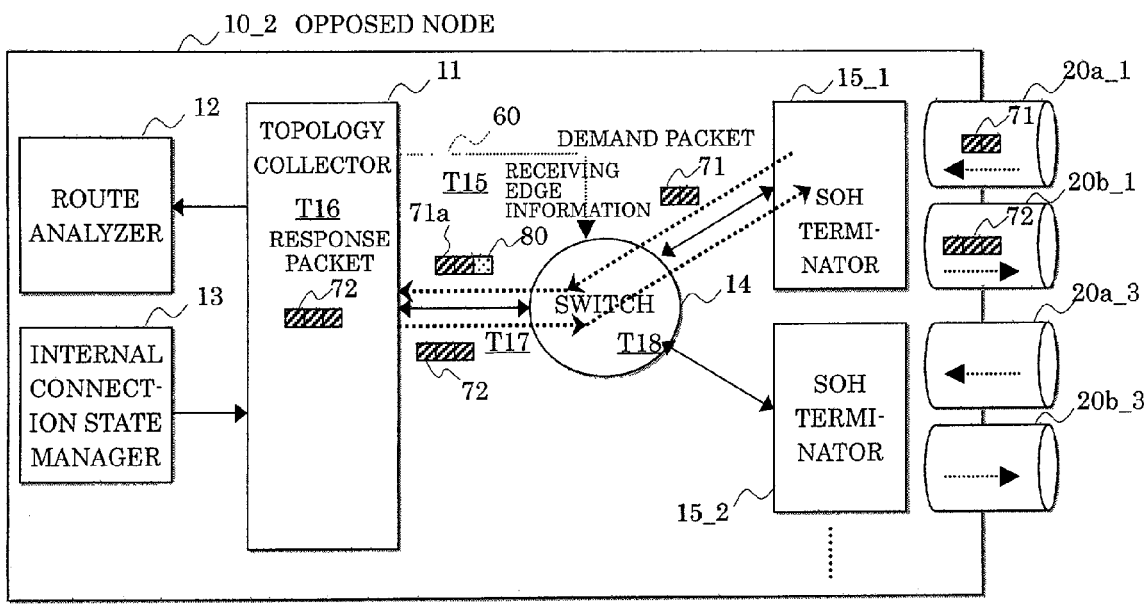
FIG. 23 is a sequence diagram showing an example of an opposed topology information (section data and connect data) acquisition procedure (2) of a collection node in a network topology collection device according to the present invention.
Figure 24:
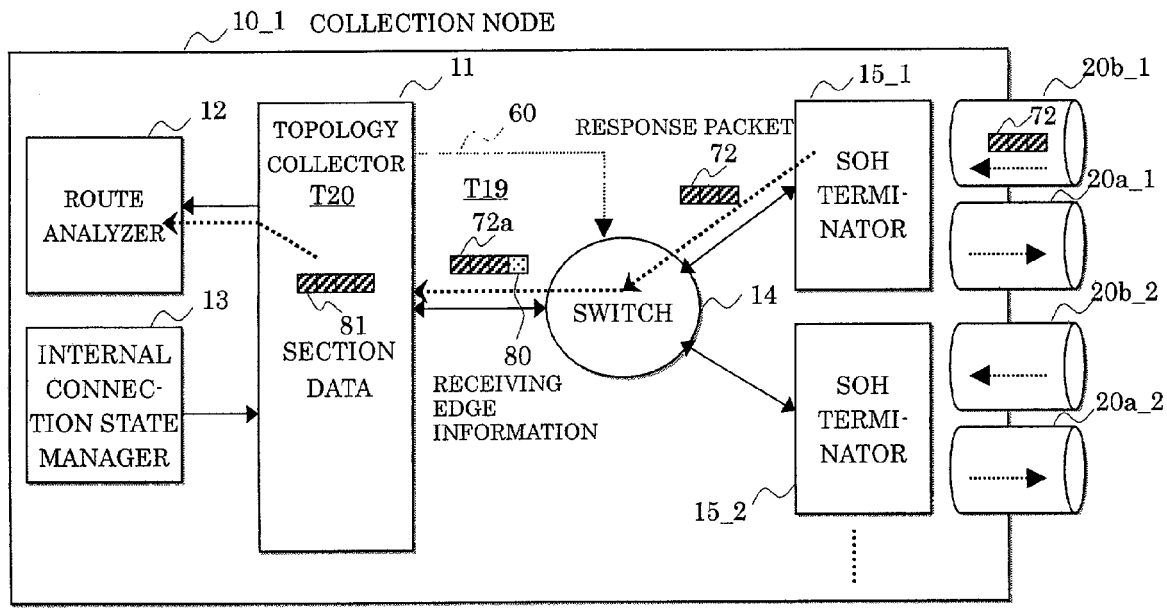
FIG. 24 is a sequence diagram showing an example of an opposed topology information (section data and connect data) acquisition procedure (3) of a collection node in a network topology collection device according to the present invention.

Hereinafter, procedures (1)–(3) will be described referring to FIGS. 22–24 (see FIG. 12) in which the network topology connection device 100 in the collection node 10_1 prepares the internal connection state information 84 (aggregation of connect data 83 (see FIGS. 21H, 21I, and 20B)) of the collection node 10_1 to which the network topology collection device itself belongs, and the section opposed topology information 82 (aggregation (see FIGS. 21D and 21G) of section data 81 (see FIG. 20A)) concerning the collection node 10_1 and the opposed nodes 10_2 and 10_3 in the network 200 shown in FIG. 11.

It is to be noted that hereinafter, the opposed topology information 82 to which the internal connection state information 84 is added is occasionally referred to as opposed topology information 82.

[1] Preparing Procedure of Opposed Topology Information

Step T11: The topology collector 11 of FIG. 22 acquires the connection information of the path within the collection node 10_1 from the internal connection state manager 13.

Step T12: The topology collector 11 prepares, from the connection information of the path, the internal connection state information 84 (see FIGS. 21H and 21I) which is an aggregation of the connect data 83 to be transmitted to the route analyzer 12.

Step T13: The topology collector transmits the demand packet 71 (see FIG. 19A) to the switch 14.

Step T14: The switch 14 transmits the demand packet 71 to all of the SOH terminators 15, which transmit the demand packet 71 by using the unused area of the section overhead (SOH).

Step T15: In the opposed node 10_2 of FIG. 23, the switch 14 receives the demand packet 71 through the SOH terminator 15_1, and transmits a demand packet 71a, obtained by adding section receiving edge information 80 received to the demand packet 71, to the topology collector 11.

Steps T16 and T17: The topology collector 11 prepares the response packet 72 (see FIG. 19B) based on the section receiving edge information 80 to be transmitted to the switch 14.

Step T18: The switch 14 switches over the response packet 72 referring to the receiving edge information 80 to be transmitted to the section 20b_1 through the SOH terminator 15_1.

Step T19: In the collection node 10_1 of FIG. 24, the switch 14 receives the response packet 72 through the SOH terminator 15_1. The switch 14 transmits a response packet 72a, obtained by adding the section receiving edge information 80 received to the response packet 72, to the topology collector 11.

Step T20: The topology collector 11 prepares the section data 81 based on the response packet 72a to be transmitted to the route analyzer 12.

Figure 1A:
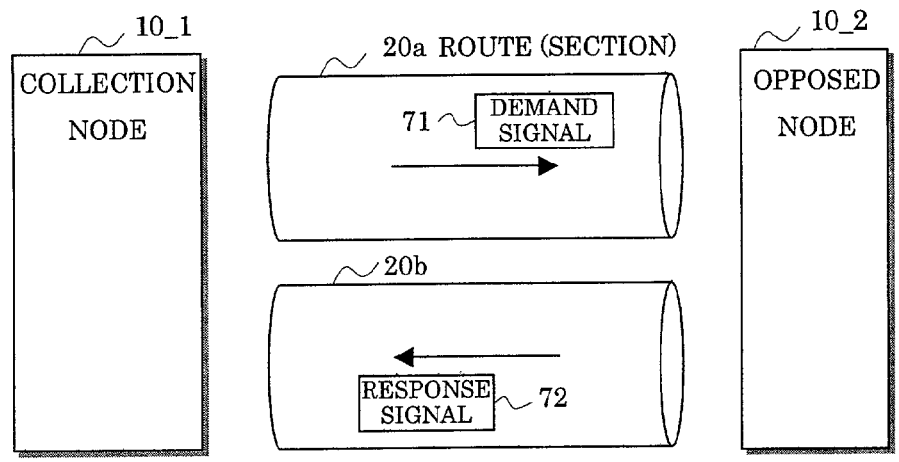
FIGS. 1A–1C are block diagrams showing a principle (1) of a network topology collection device according to the present invention.
Figure 1B:
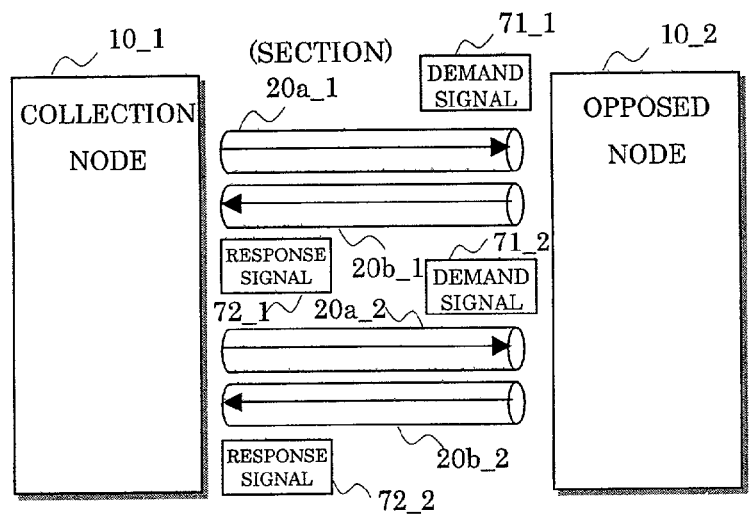
Figure 1C:
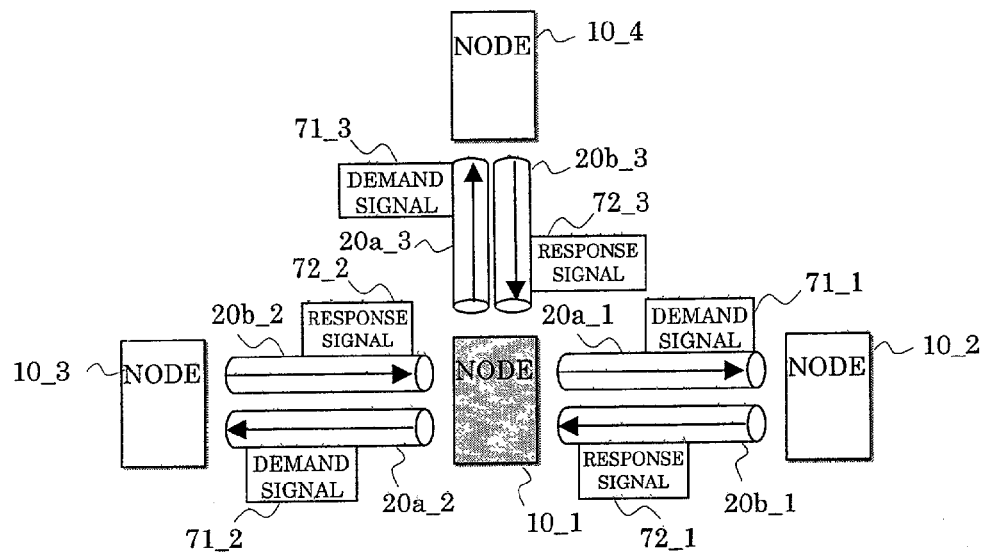
Figure 2:
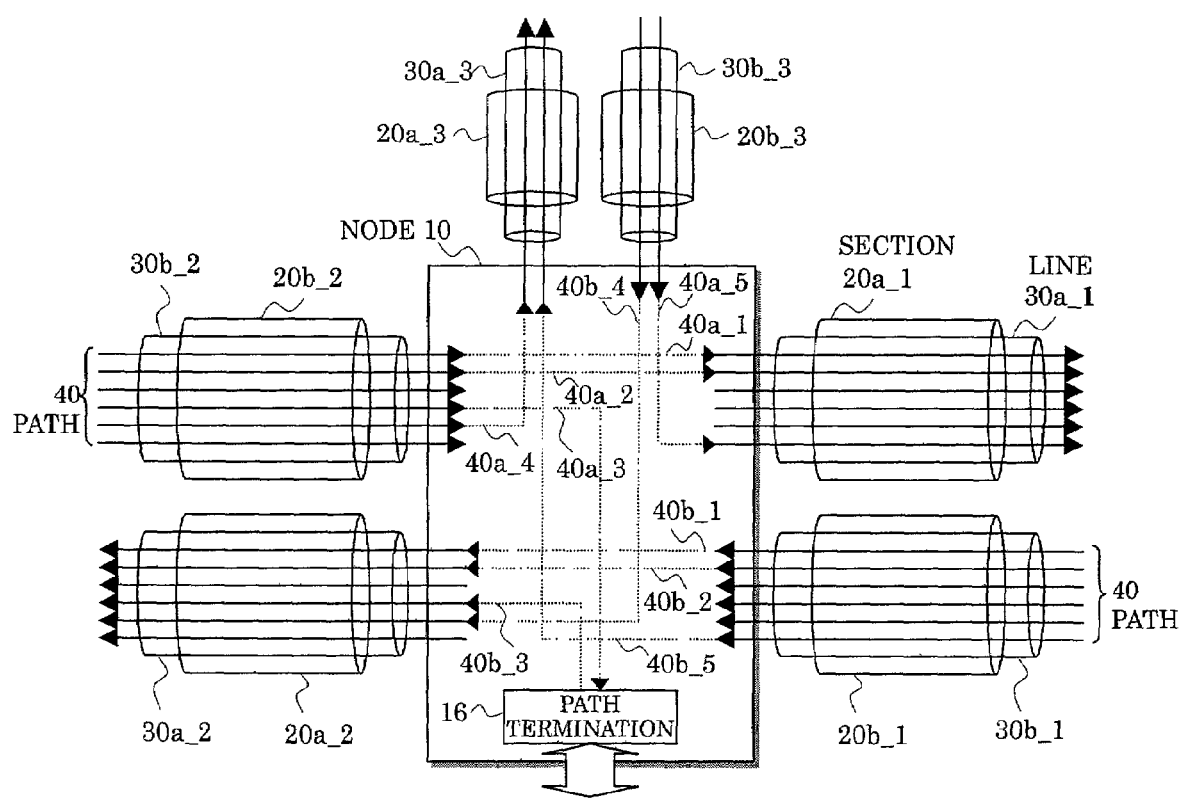
FIG. 2 is a block diagram showing a principle (2) of a network topology collection device according to the present invention.
Figure 3:
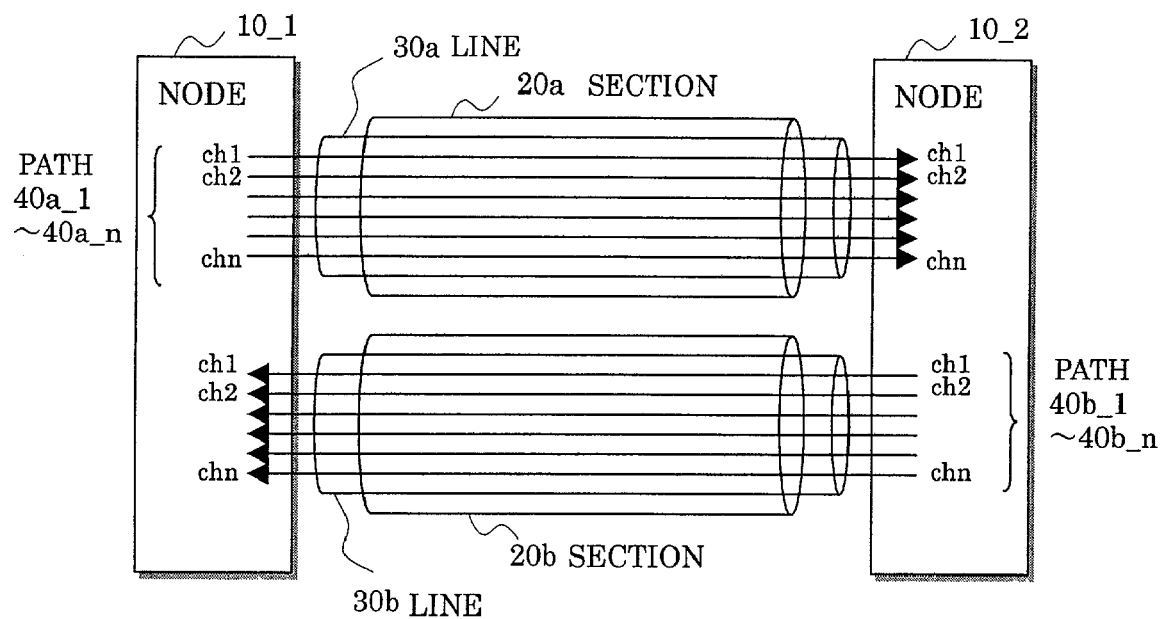
FIG. 3 is a block diagram showing a principle (3) of a network topology collection device according to the present invention.
Figure 4:
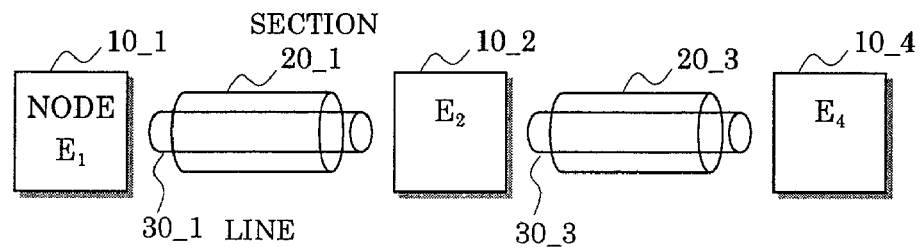
FIG. 4 is a block diagram showing a principle (4) of a network topology collection device according to the present invention.
Figure 5:
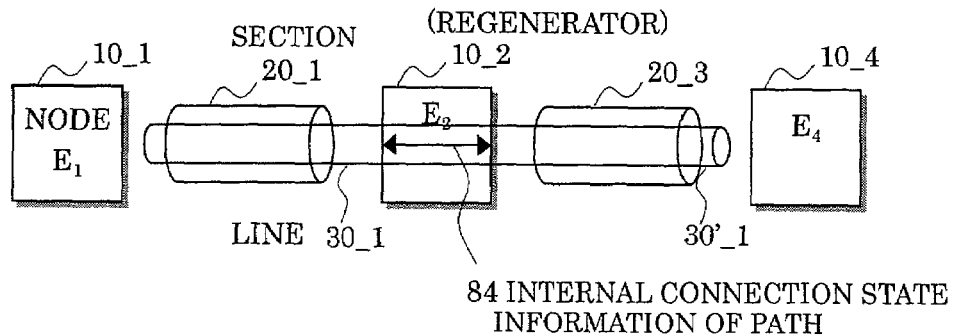
FIG. 5 is a block diagram showing a principle (5) of a network topology collection device according to the present invention.
Figure 6:
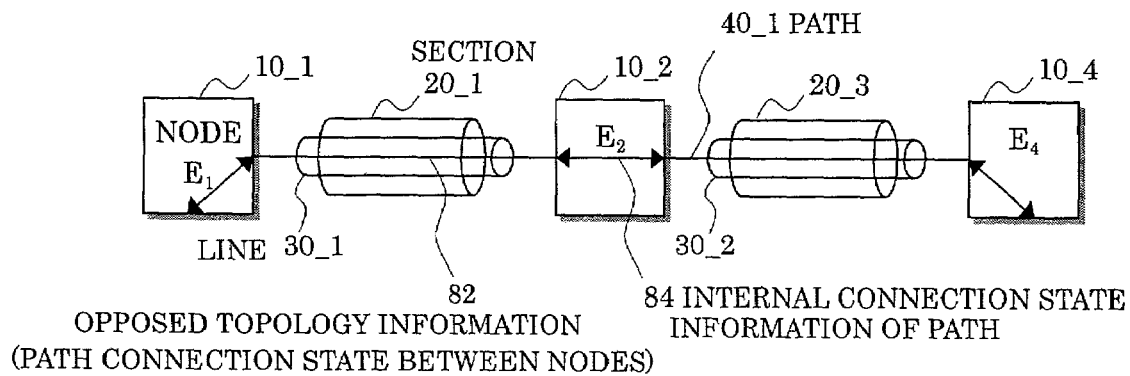
FIG. 6 is a block diagram showing a principle (6) of a network topology collection device according to the present invention.
Figure 7:
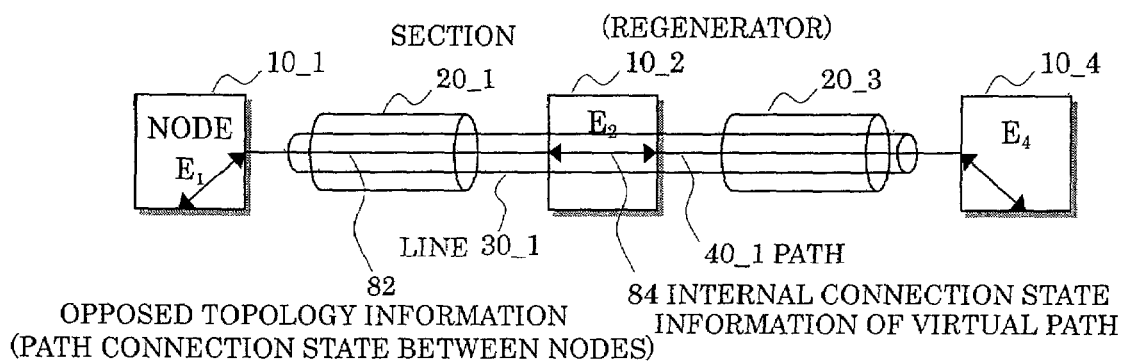
FIG. 7 is a block diagram showing a principle (7) of a network topology collection device according to the present invention.
Figure 8:
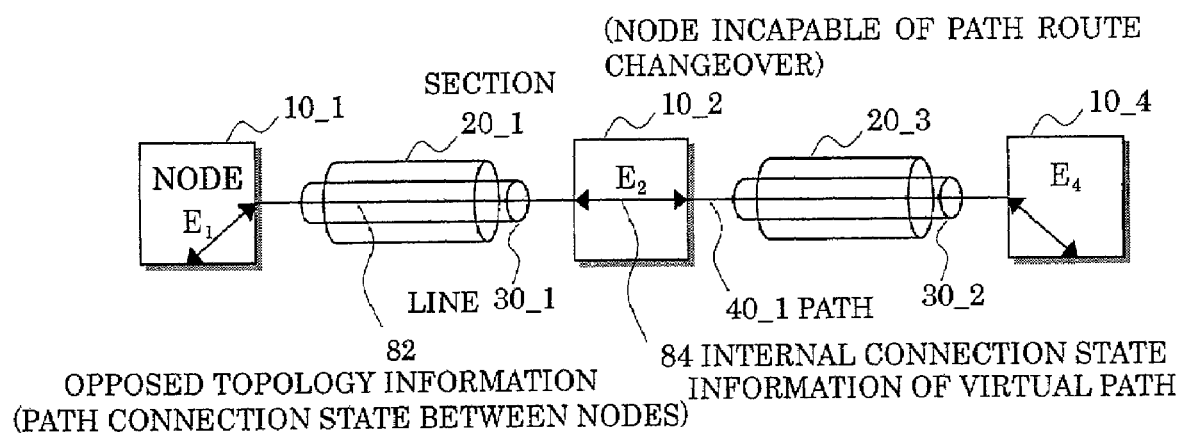
FIG. 8 is a block diagram showing a principle (8) of a network topology collection device according to the present invention.
Figure 9A:
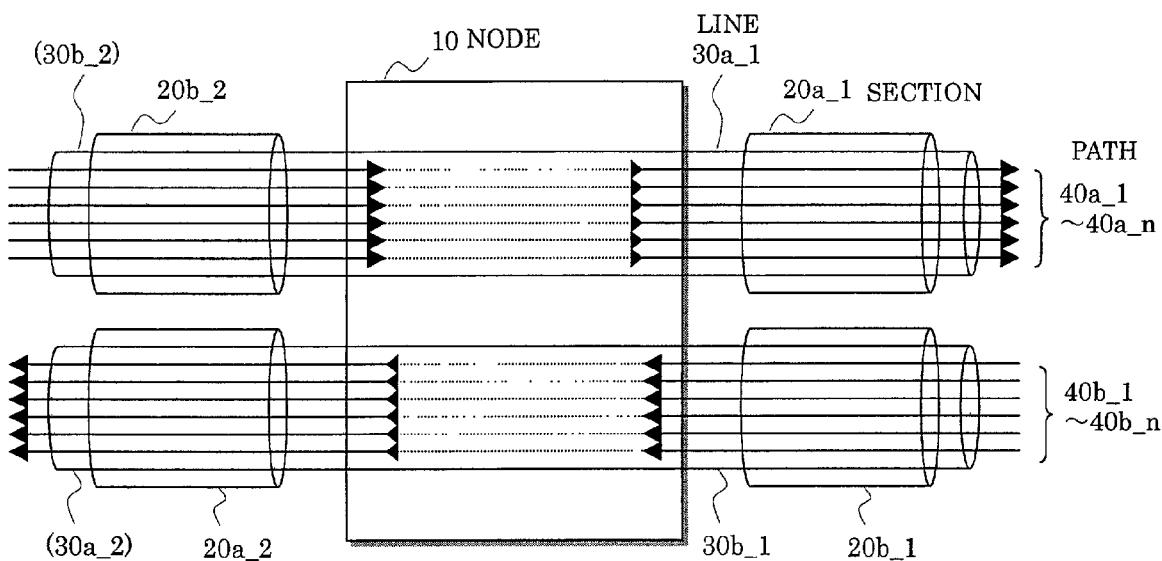
FIGS. 9A and 9B are block diagrams showing a principle (9) of a network topology collection device according to the present invention.
Figure 9B:
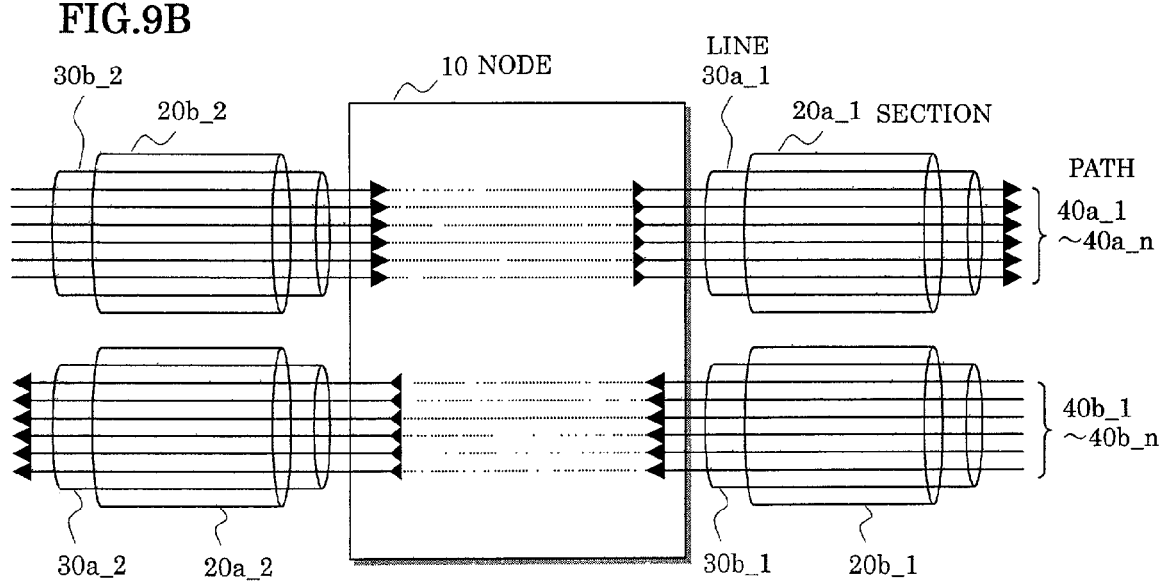
Figure 10:
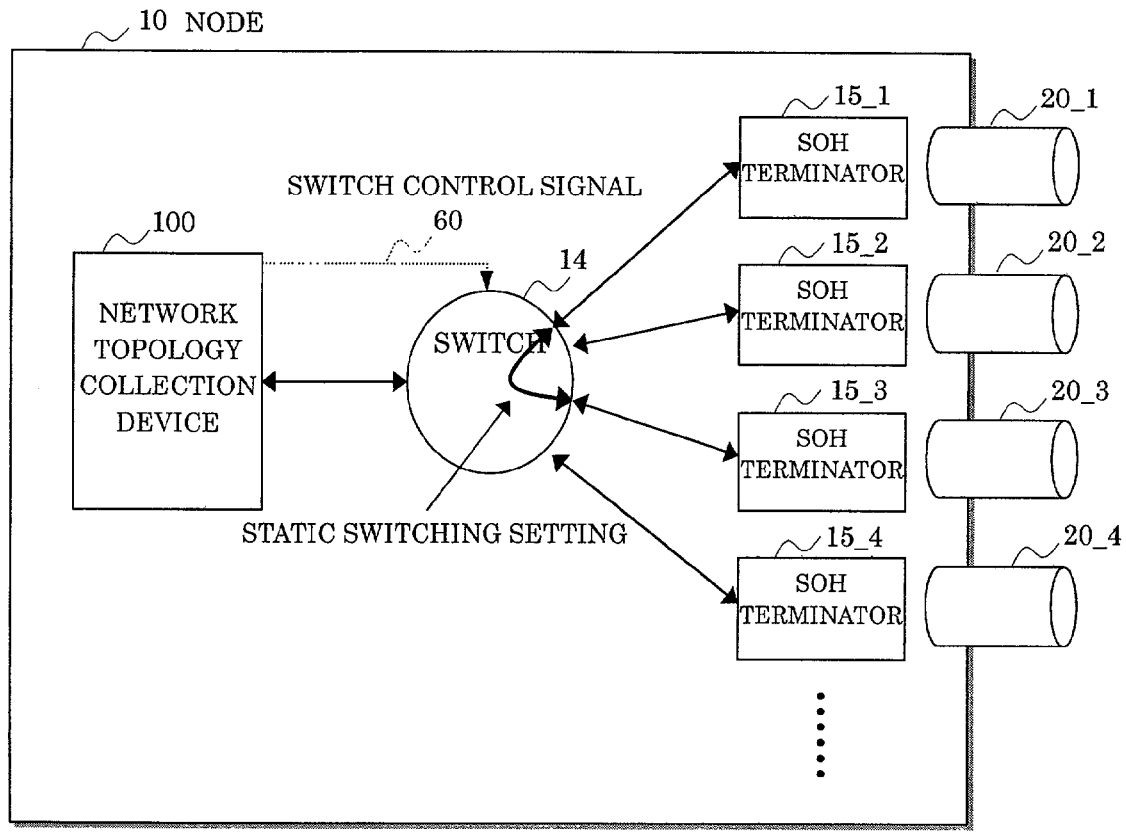
FIG. 10 is a block diagram showing a principle (10) of a network topology collection device according to the present invention.

It is to be noted that, as shown in FIG. 1B, when the node 10_1 is connected to the node 10_2 with a plurality of sections 20, for example, as many section data 81 as the sections 20 are prepared.

Similarly, the collection device 100 in the collection node 10_1 prepares the section data 81 of the section 20 between the opposed node 10_3 and the collection node 10_1 itself to be transmitted to the route analyzer 12.

Thus, the aggregation (i.e. section opposed topology information 82) of the section data 81 corresponding to the sections 20 connecting the collection node 10_1 and the opposed nodes 10_2, 10_3 is collected at the route analyzer 12 in the collection node 10_1.

Hereinafter, the procedure in which the collection node 10_1 collects the opposed topology information (aggregation of section data 81 and connect data 83) of the opposed node 10 will be described referring to FIG. 11 and FIGS. 25–32.

[2] Collection Procedure of Opposed Topology Information of Opposed Node

Figure 11:
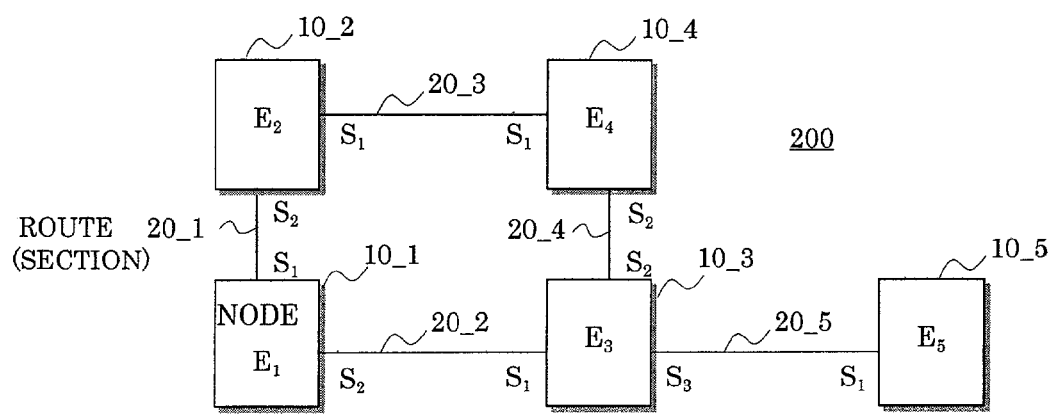
FIG. 11 is a diagram showing a network arrangement in a principle (11) of a network topology collection device according to the present invention.
Figure 12:
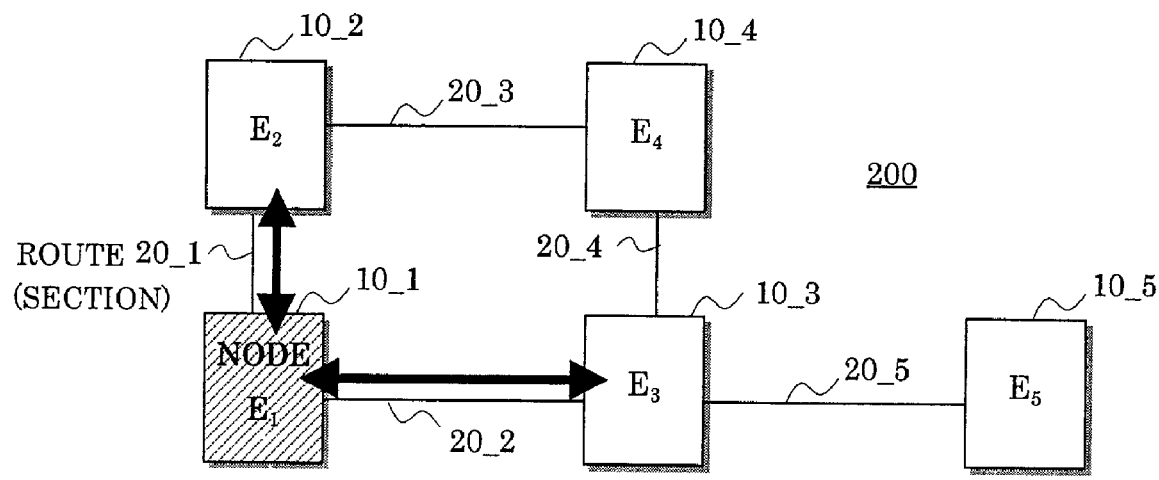
FIG. 12 is a block diagram showing a collection procedure (1) of a network topology in a principle (11) of a network topology collection device according to the present invention.
Figure 13:
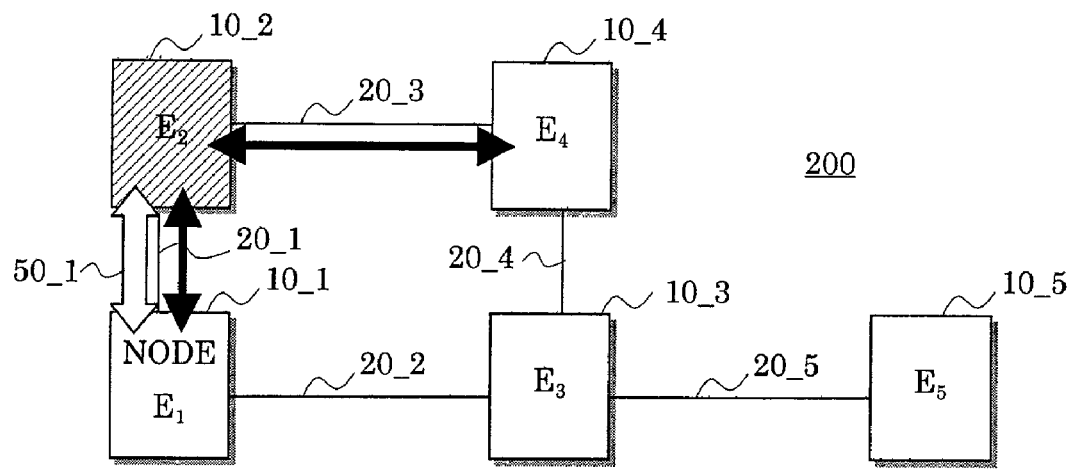
FIG. 13 is a block diagram showing a collection procedure (2) of a network topology in a principle (11) of a network topology collection device according to the present invention.
Figure 25:
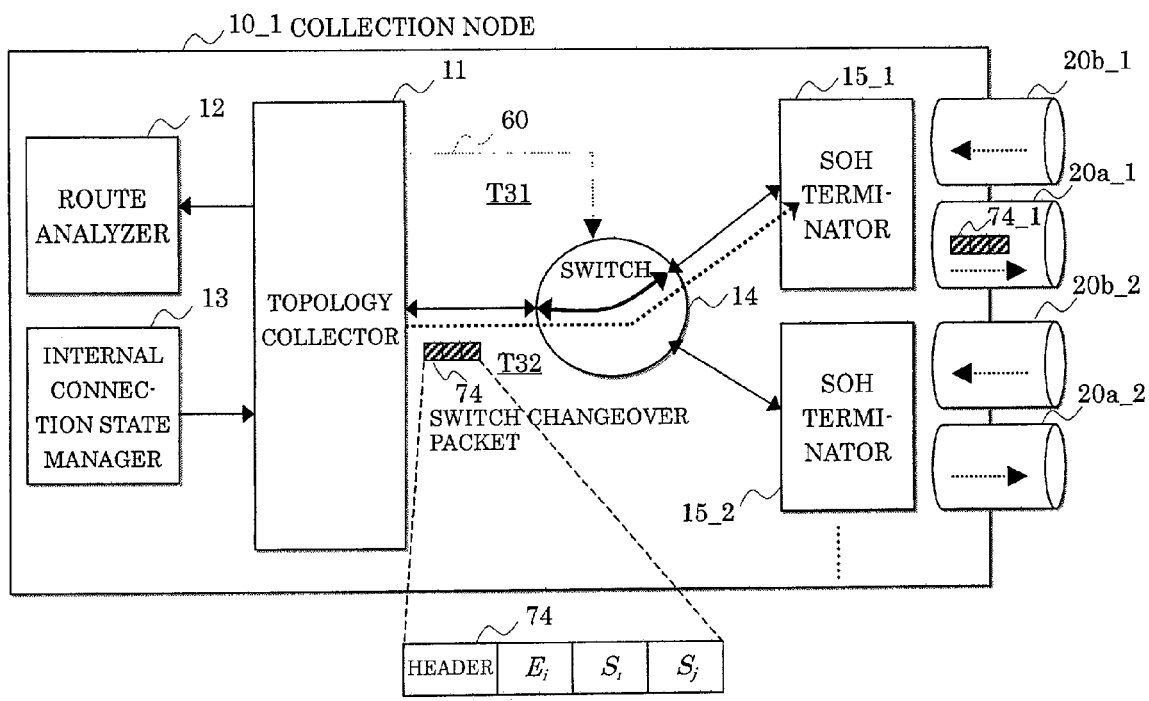
FIG. 25 is a sequence diagram showing an example of an opposed topology information (section data and connect data) acquisition procedure (1) of an opposed node in a network topology collection device according to the present invention.

A procedure (1) in which the collection node 10_1 collects the section data 81 and the connect data 83 of the opposed node 10_2 in the network in FIG. 11 will be firstly described referring to FIG. 25 (see FIG. 13).

Step T31: In FIG. 25, the topology collector 11 in the collection node 10_1 controls the switch 14 with the switch control signal 60, and sets the static switch between the topology collector 11 and the SOH terminator 15_1 corresponding to the opposed node 10_2.

Step T32: The topology collector 11 transmits, to the switch 14, a switch changeover packet 74=[$E_2$, $S_2$, t] for setting the static switch between the section 20_1 of the opposed node 10_2 and the topology collector 11. The switch 14 transmits the switch changeover packet 74 according to the static switch.

When the static switch is set between two sections 20, the format of switch changeover packet 74 is [identifier "$E_i$" of the node 10, identifier "$S_i$" of the section edge, identifier "$S_j$" of another section edge]. When it is set between the section 20 and the topology collector 11, its format is [identifier "$E_i$" of the node 10, identifier "$S_i$" of the section edge, "t" meaning the topology collector 11].

As shown in FIG. 11, a switch changeover packet 74_1 for setting the static switch between the section 20_1 and the topology collector 11 in the node 10_2 having the identifier $E_2$ is [$E_2$, $S_2$, t].

Hereinafter, procedures (2) and (3) after the switch changeover packet 74 is received in the opposed node 10_2 will be described.

Figure 26:
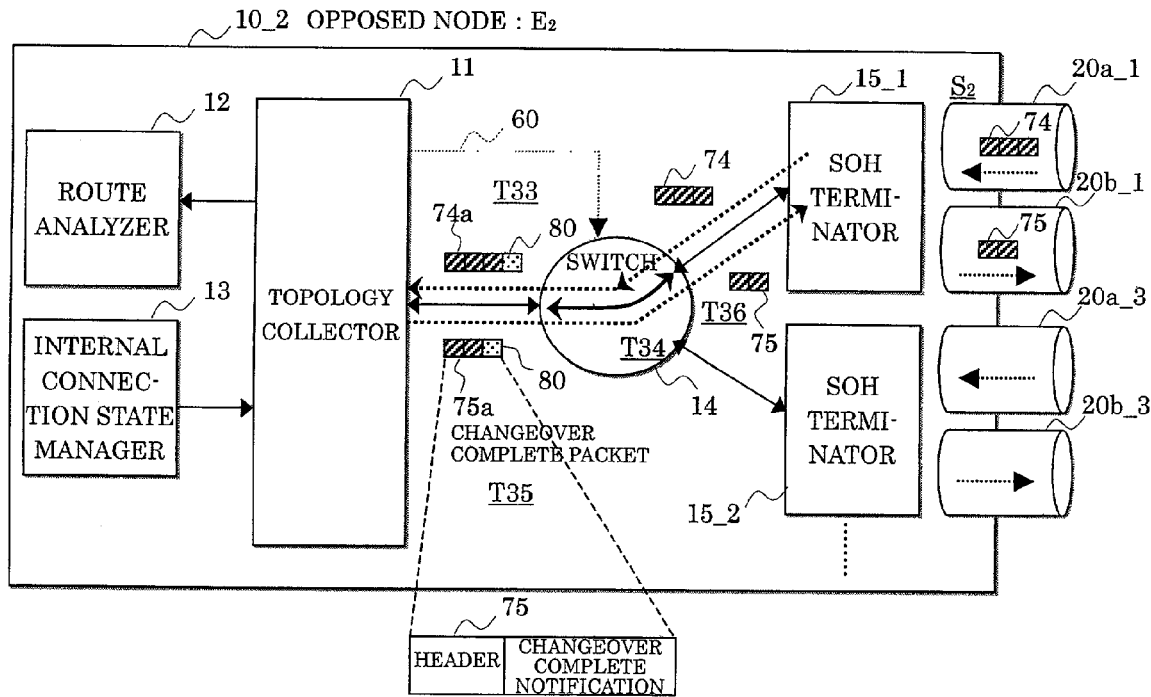
FIG. 26 is a sequence diagram showing an example of an opposed topology information (section data and connect data) acquisition procedure (2) of an opposed node in a network topology collection device according to the present invention.

Step T33: In FIG. 26, the switch 14 in the opposed node 10_2 transmits, to the topology collector 11, the switch changeover packet 74a obtained by adding the section receiving edge information 80 indicating that the switch changeover packet 74 is received from the section 20_1 to the switch changeover packet 74.

Step T34: The topology collector 11, based on the switch changeover packet 74a, sets the static switch with the switch control signal 60, within the switch 14, mutually connecting the section 20_1 and the topology collector 11.

Step T35: The topology collector 11 transmits, to the switch 14, a packet 75a obtained by adding the section receiving edge information 80 received with the switch changeover packet 74a at step T33 to a changeover complete packet 75 for notifying the changeover completion of the stitch 14. The format of the changeover complete packet 75 is "header"+"changeover complete notification".

Step T36: The switch 14 refers to the section receiving edge information 80 received with the changeover complete packet 75a, and transmits, to the section 20_1 indicated by the receiving edge information 80, the changeover complete packet 75 obtained by deleting the receiving edge information 80 from the changeover complete packet 75a.

Figure 27:
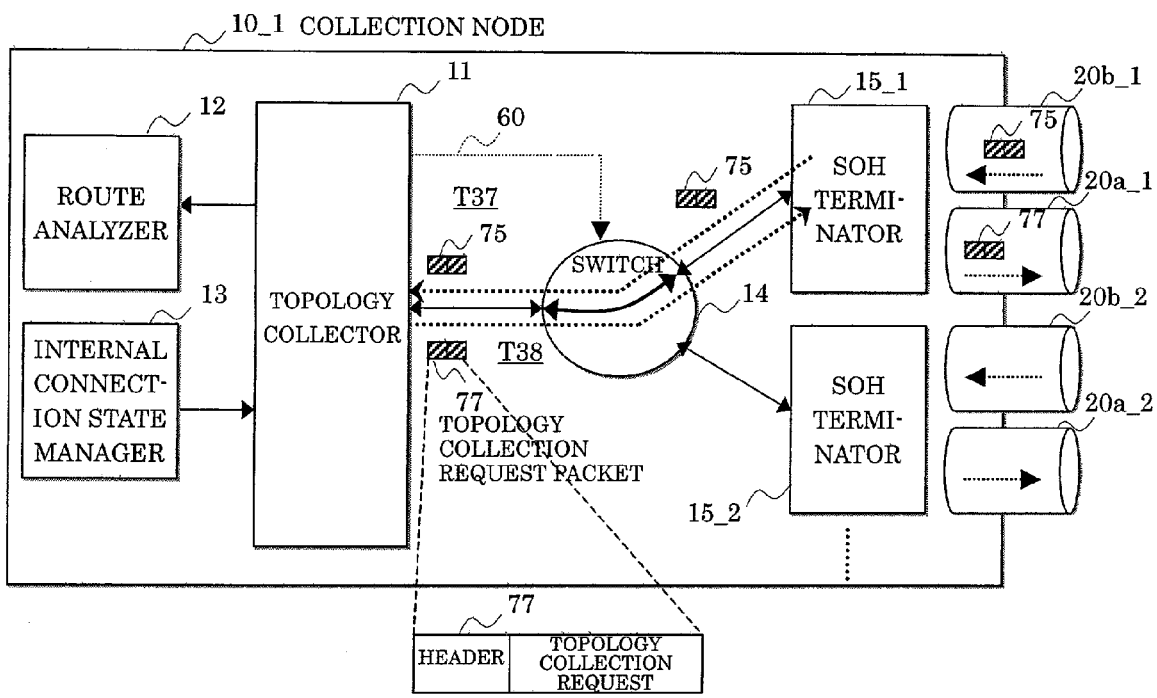
FIG. 27 is a sequence diagram showing an example of an opposed topology information (section data and connect data) acquisition procedure (3) of an opposed node in a network topology collection device according to the present invention.

Step T37: In FIG. 27, the switch 14 in the collection node 10_1 transmits the changeover complete packet 75 to the topology collector 11 according to the static switch set at step T31.

Step T38: After receiving the changeover complete packet 75, the topology collector 11 transmits a topology collection request packet 77 to the switch 14. The format of the topology collection request packet 77 is ["header"+"indication of topology collection request"]. The switch 14 transmits the packet 77 according to the static switch.

Hereinafter, procedures (4) and (5) after the packet 77 is received in the opposed node 10_2 will be described.

Figure 28:
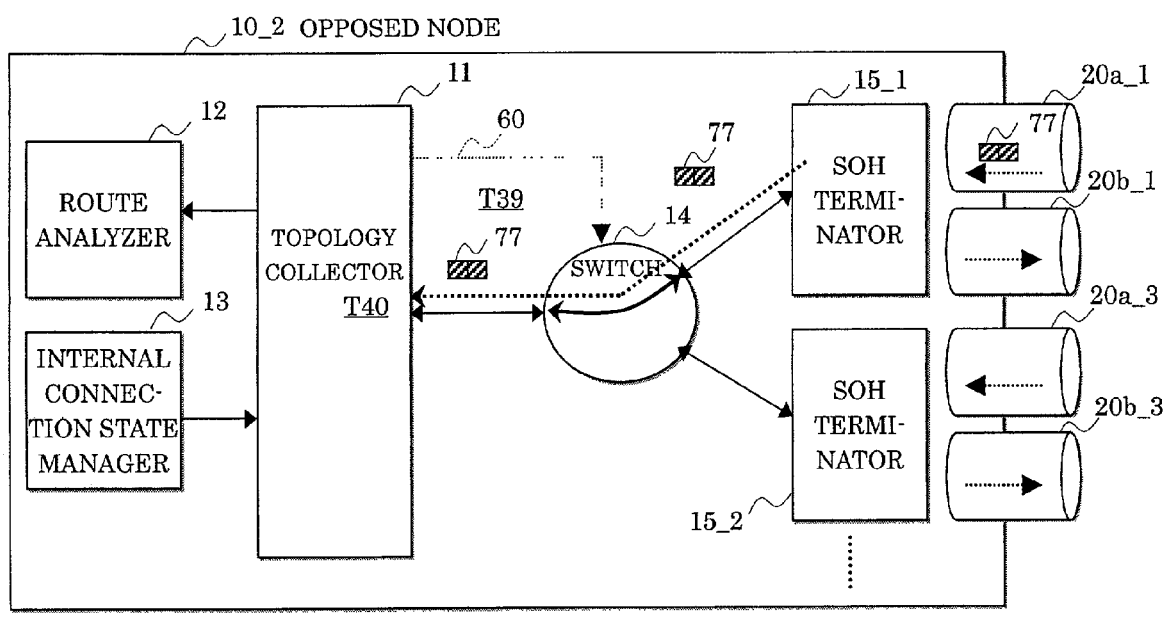
FIG. 28 is a sequence diagram showing an example of an opposed topology information (section data and connect data) acquisition procedure (4) of an opposed node in a network topology collection device according to the present invention.

Step T39: In FIG. 28, the switch 14 in the opposed node 10_2 transmits the topology collection request packet 77 to the topology collector 11 according to the static switch.

Step T40: The topology collector 11 performs the processing of the topology collection requested by the received topology collection request packet 77. Namely, the topology collector 11 starts the processing shown at steps T12–T20 of FIGS. 22–24, and collects the connect data 83 of the path in the node 10_2 to which the network topology collection device itself belongs and the section data 81 of the section connecting the node 10_2 and the opposed node 10.

As many connect data 83 as the path connection pairs within the node 10_2 are collected, and as many section data 81 as the sections terminated by the node 10_2 are collected.

Step T41: In FIG. 29A, the topology collector 11 prepares the section data 81, the connect data 83, and a section data packet 78 and a connect data packet 79 in which the respective data are packetted. As many packets 78 and 79 as the section data 81 and the connect data 83 are respectively prepared.

FIG. 29B shows a format of the section data packet 78, that is ["header"+"section data 81 (see FIG. 20A)"]. FIG. 29C shows a format of the section data packet 79, that is ["header"+"connect data 83 (see FIG. 20B)"].

The topology collector 11 transmits the prepared section data packet 78 and connect data packet 79 to the switch 14, which transmits these packets according to the static switch.

It is to be noted that in FIG. 29A, only one of the section data packet 78 and the connect data packet 79 are respectively shown, while as many packets as the section data 81 and the connect data 83 are actually transmitted. Namely, the section opposed topology information 82 and the internal connection state information 84 of the path are transmitted.

Figure 30:
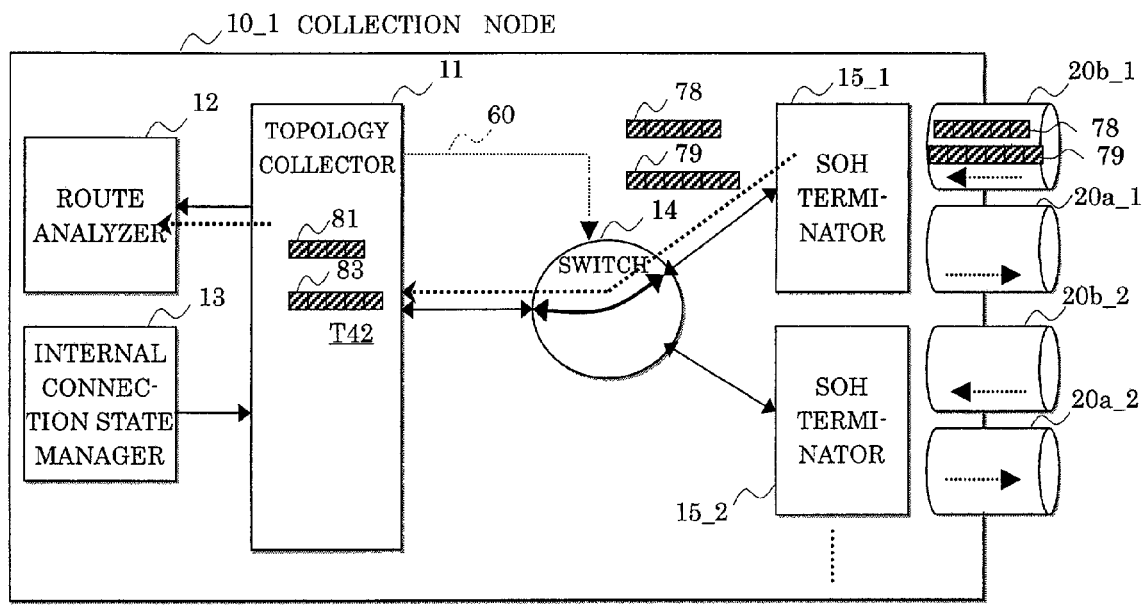
FIG. 30 is a sequence diagram showing an example of an opposed topology information (section data and connect data) acquisition procedure (6) of an opposed node in a network topology collection device according to the present invention.
Figure 31:
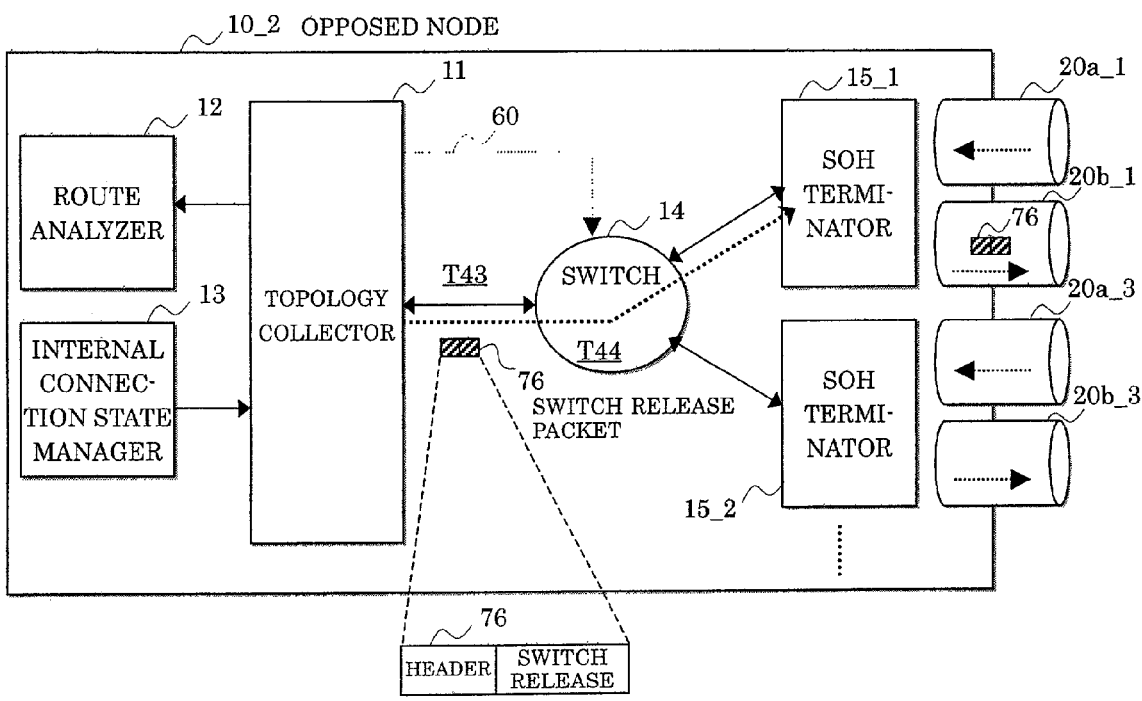
FIG. 31 is a sequence diagram showing an example of an opposed topology information (section data and connect data) acquisition procedure (7) of an opposed node in a network topology collection device according to the present invention.

Step T42: In FIG. 30, the switch 14 in the collection node 10_1 transmits the section data packet 78 and the connect data packet 79 to the topology collector 11 according to the static switch.

The topology collector 11 transmits the section data 81 and the connect data 83 obtained by removing the header from the section data packet 78 and the connect data packet 79 respectively to the route analyzer 12.

Step T43: On the other hand, in FIG. 31, the opposed node 10_2 transmits a switch release packet 76 to the switch 14 after the transmission of all the section data packet 78 and the connect data packet 79 is completed at step T41.

The format of the switch release packet is ["header"+"indication of switch release"].

Step T44: After transmitting the switch release packet 76 according to the static switch, the switch 14 releases the static switch.

Figure 32:
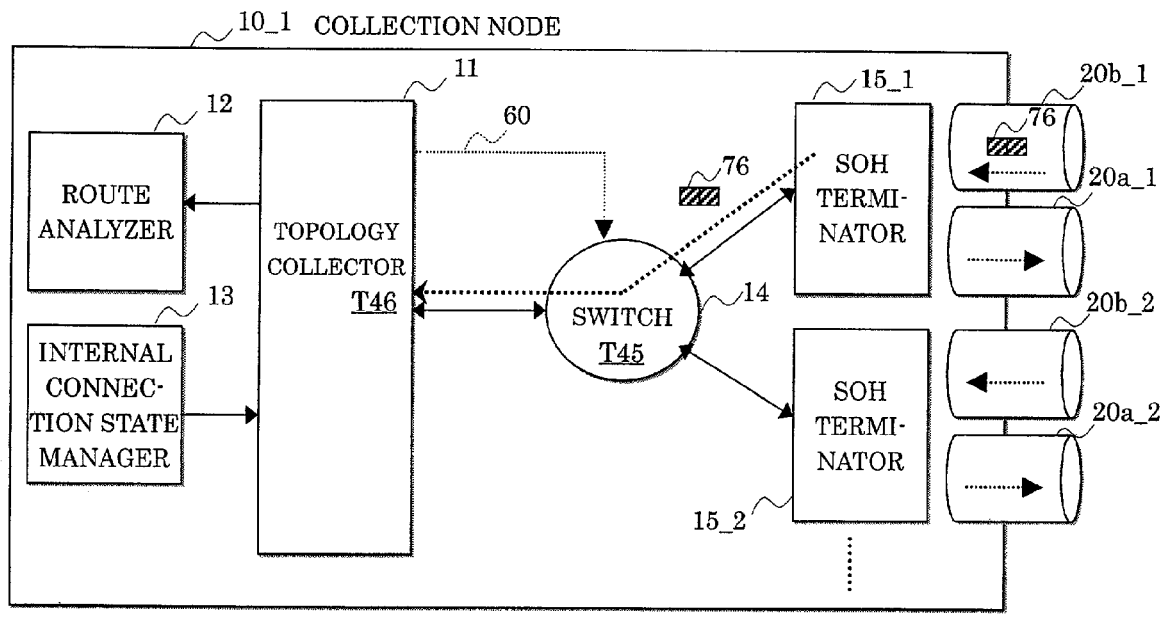
FIG. 32 is a sequence diagram showing an example of an opposed topology information (section data and connect data) acquisition procedure (8) of an opposed node in a network topology collection device according to the present invention.
Figure 33:
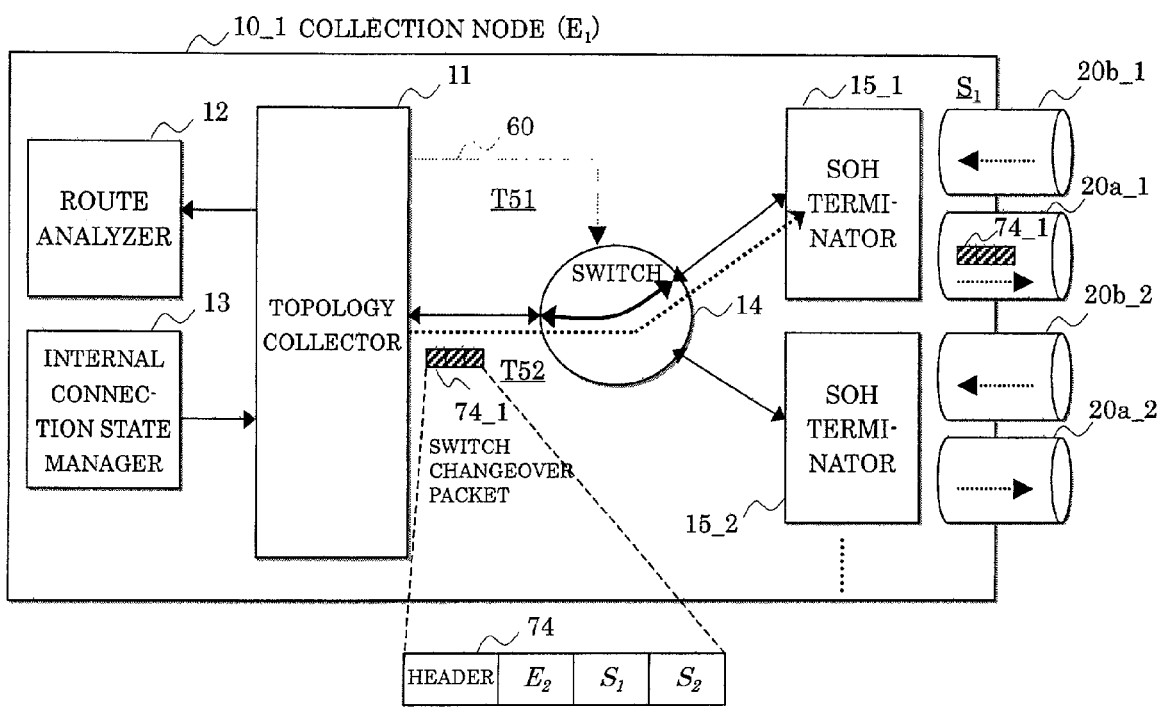
FIG. 33 is a sequence diagram showing an example of an opposed topology information (section data and connect data) acquisition procedure (1) of a remote node in a network topology collection device according to the present invention.

Step T45: In FIG. 32, in the same way as the above-mentioned step T44, the switch 14 in the collection node 10_1 transmits the switch release packet 76 to the topology collector 11 according to the static switch, and then releases the static switch.

Step T46: The topology collector 11 determines whether or not there is the node 10 which does not collect the section data 81 and the connect data 83 based on the collected section data 81 (opposed topology information 82), and determines the next node 10 to be collected.

Figure 14:
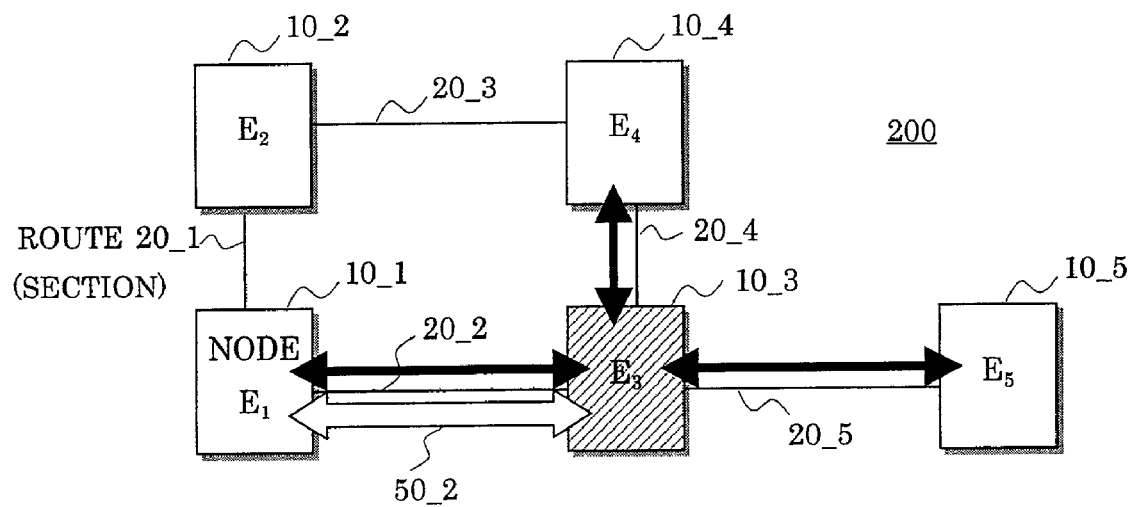
FIG. 14 is a block diagram showing a collection procedure (3) of a network topology in a principle (11) of a network topology collection device according to the present invention.

Hereafter, the collection node 10_1 similarly collects the section opposed topology information of the opposed node 10_3 (see FIG. 14).

[3] Collection Procedure of Remote Node Information

Figure 15:
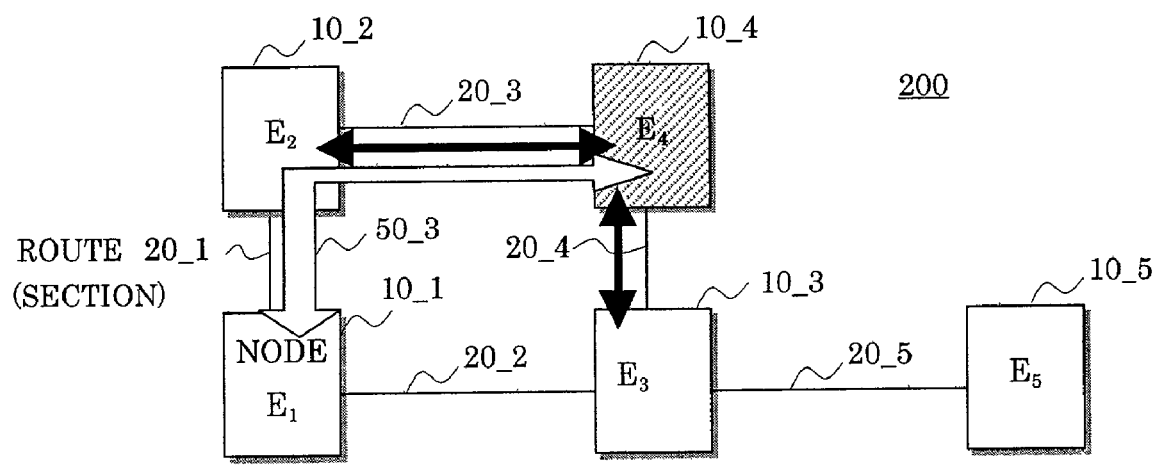
FIG. 15 is a block diagram showing a collection procedure (4) of a network topology in a principle (11) of a network topology collection device according to the present invention.

Hereinafter, procedures (1)–(15) will be described referring to FIGS. 33–47 (see FIG. 15) in which the collection node 10_1 collects the opposed topology information (section opposed topology information (aggregation of section data)+path internal connection state information (aggregation of connect data 83)) of a remote node 10_4 through the opposed node (relay node 10_2) in the network in FIG. 11.

Step T51: The topology collector 11 in the collection node 10_1 of FIG. 33 controls the switch 14 with the switch control signal 60, and sets the static switch between the topology collector 11 and the SOH terminator 15_1 corresponding to the relay node 10_2.

Step T52: The topology collector 11 transmits the switch changeover packet 74_1, to the switch 14, for setting the static switch to the switch 14 in the relay node 10_2. The switch 14 transmits the switch changeover packet 74_1 according to the static switch set at step T51.

In the node 10_2 having the identifier $E_2$, as shown in FIG. 11, the switch changeover packet 74_1 for setting the static switch between the sections 20_1 and 20_3 is [$E_2$, $S_1$, $S_2$].

Figure 34:
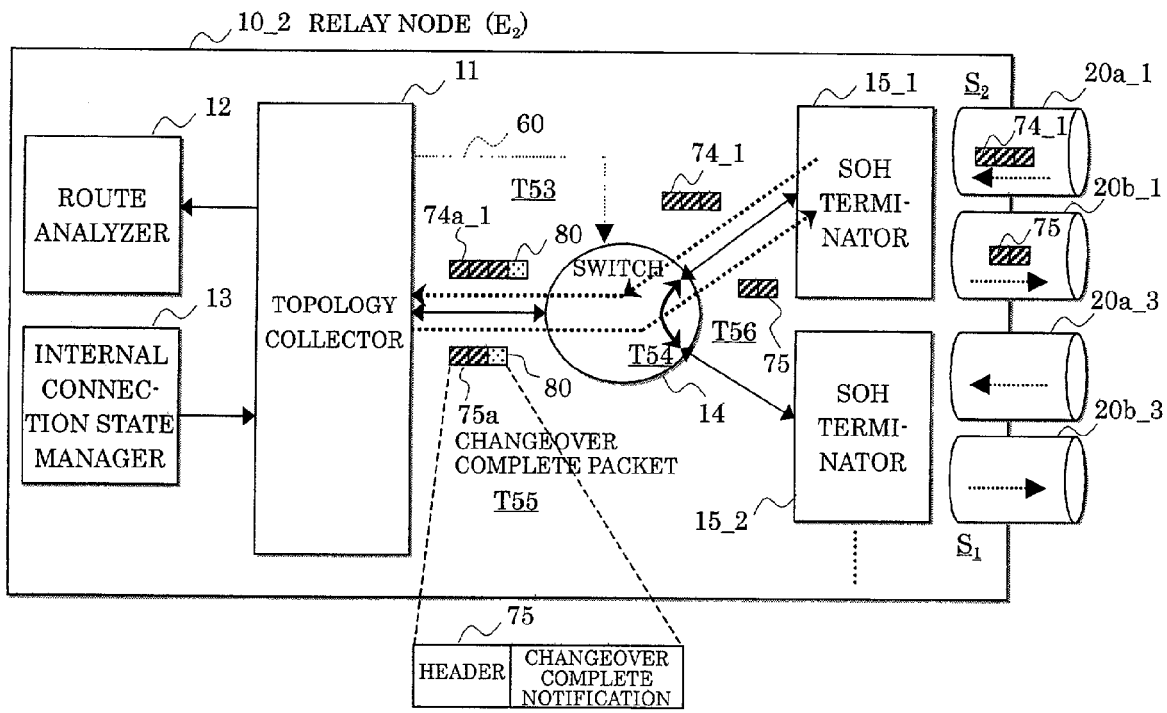
FIG. 34 is a sequence diagram showing an example of an opposed topology information (section data and connect data) acquisition procedure (2) of a remote node in a network topology collection device according to the present invention.

Step T53: In FIG. 34, the switch 14 in the relay node 10_2 transmits, to the topology collector 11, the switch changeover packet 74a_1 obtained by adding the section receiving edge information 80, indicating that the switch changeover packet 74_1 is received from the section 20_1, to the switch changeover packet 74_1.

Step T54: The topology collector 11, based on the switch changeover packet 74a_1, sets the static switch, for mutually connecting the section 20_1 (SOH terminator 15_1) and the section 20_3 (SOH terminator 15_2), in the switch 14 with the switch control signal 60.

Step T55: The topology collector 11 transmits, to the switch 14, the packet 75a obtained by adding the section receiving edge information 80 received at step T53 to the changeover complete packet 75 for notifying the completion of the changeover of the switch 14.

Step T56: The switch 14 refers to the section receiving edge information 80 received with the changeover complete packet 75, and transmits the changeover complete packet 75, obtained by deleting the receiving edge information 80 from the switchover complete packet 75a, to the section 20_1 indicated by the section receiving edge information 80.

Figure 35:
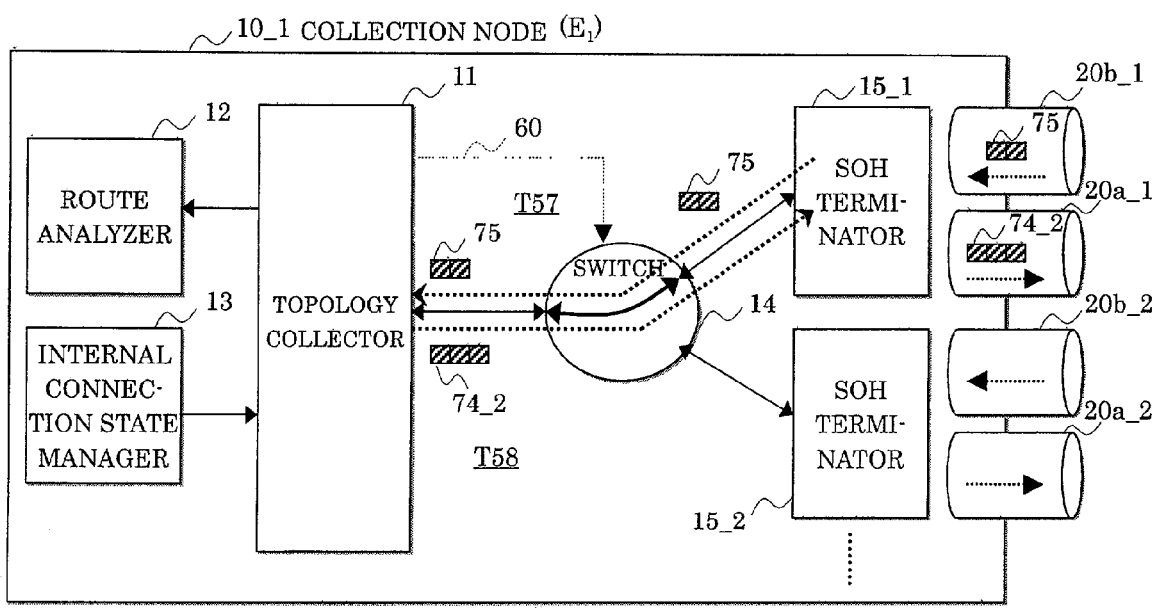
FIG. 35 is a sequence diagram showing an example of an opposed topology information (section data and connect data) acquisition procedure (3) of a remote node in a network topology collection device according to the present invention.

Step T57: In FIG. 35, the switch 14 in the collection node 10_1 transmits the changeover complete packet 75 to the topology collector 11 according to the static switch set at step T51.

Step T58: After receiving the changeover complete switch 75, the topology collector 11 transmits, to the switch 14, a switch changeover packet 74_2=[$E_4$, $S_1$, t] for setting the static switch between the section 20_3 in the remote node 10_4 and the topology collector 11.

Figure 36:
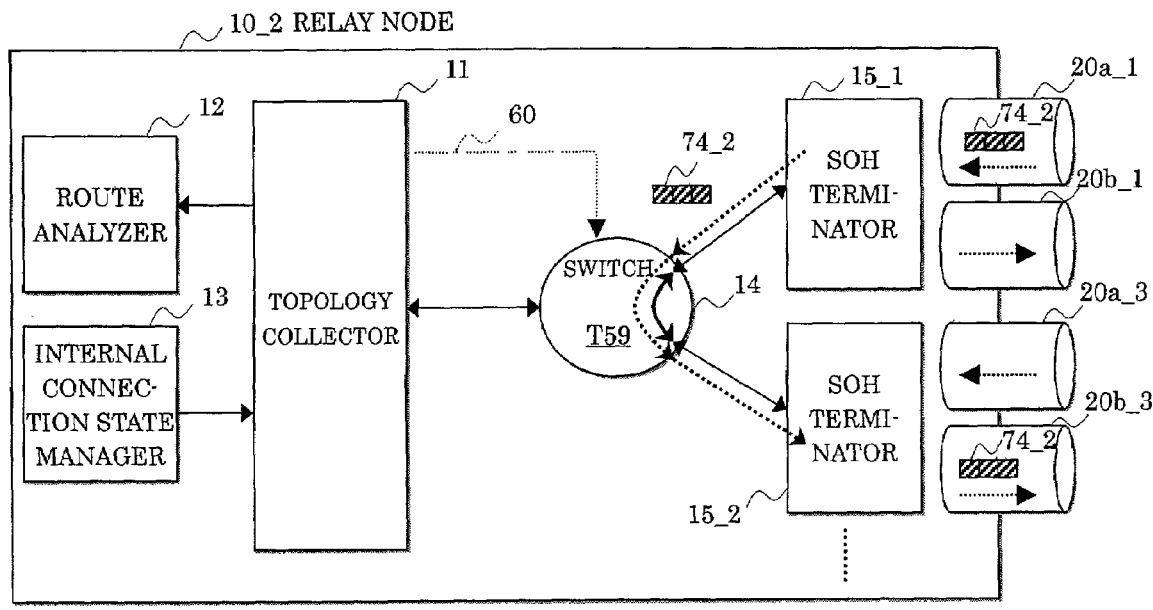
FIG. 36 is a sequence diagram showing an example of an opposed topology information (section data and connect data) acquisition procedure (4) of a remote node in a network topology collection device according to the present invention.

Step T59: In FIG. 36, the switch 14 in the relay node 10_2 transmits the switch changeover packet 74_2 according to the static switch already set at the above-mentioned step T56.

It is to be noted that when the relay node 10 further exists between the relay node 10_2 and the remote node 10_4, the process of steps T52–T57 is repeated as many times as the number of the relay nodes.

Hereinafter, a procedure (5) after the switch changeover packet 74_2 is received in the remote node 10_4 will be described.

Figure 37:
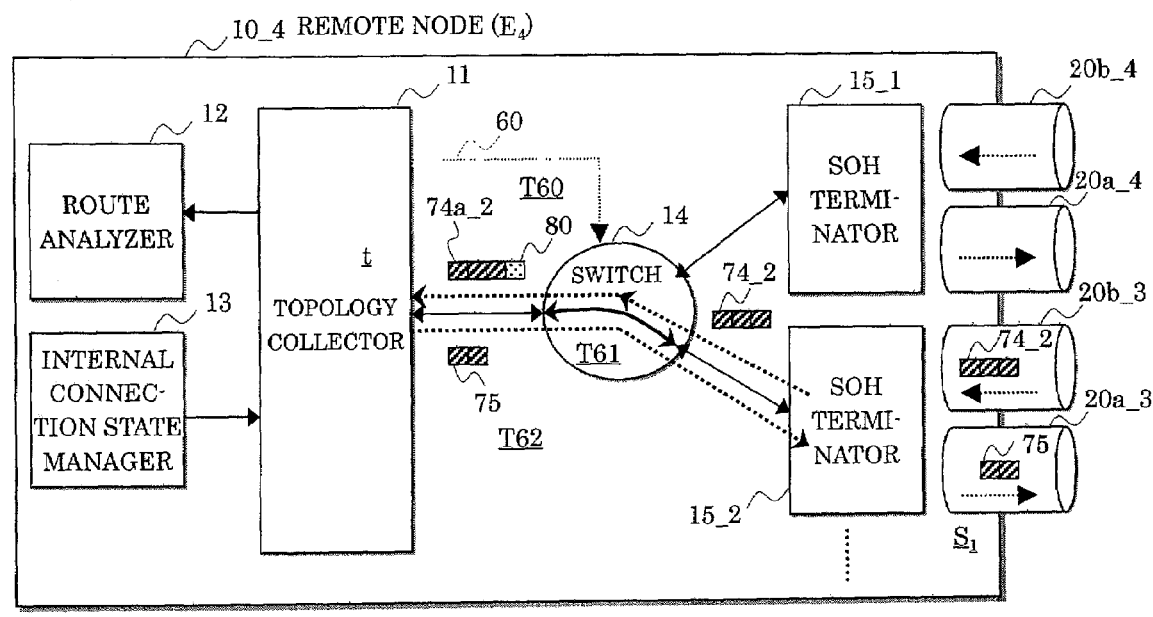
FIG. 37 is a sequence diagram showing an example of an opposed topology information (section data and connect data) acquisition procedure (5) of a remote node in a network topology collection device according to the present invention.

Step T60: In FIG. 37, the switch 14 in the remote node 10_4 transmits to the topology collector 11 a switch changeover packet 74a_2 obtained by adding to the switch changeover packet 74_2 the section receiving edge information 80 indicating the section having received the switch changeover packet 74_2.

Step T61: The topology collector 11, based on the switch changeover packet 74a_2, sets the static switch, for mutually connecting the topology collector 11 and the SOH terminator 15_2, in the switch 14 with the switch control signal 60.

Step T62: Also, the topology collector 11 transmits the changeover complete packet 75 to the switch 14, which transmits the changeover complete packet 75 according to the static switch set at the above-mentioned step T61.

Figure 38:
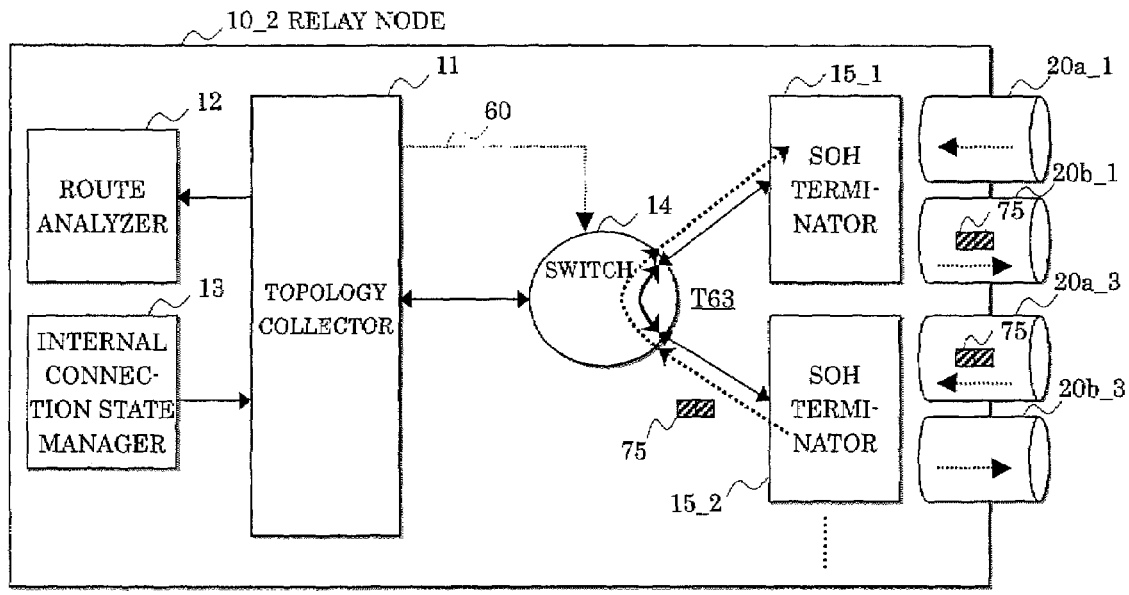
FIG. 38 is a sequence diagram showing an example of an opposed topology information (section data and connect data) acquisition procedure (6) of a remote node in a network topology collection device according to the present invention.

Step T63: In FIG. 38, the switch 14 in the relay node 10_2 transmits the changeover complete packet 75 according to the static switch.

Figure 39:
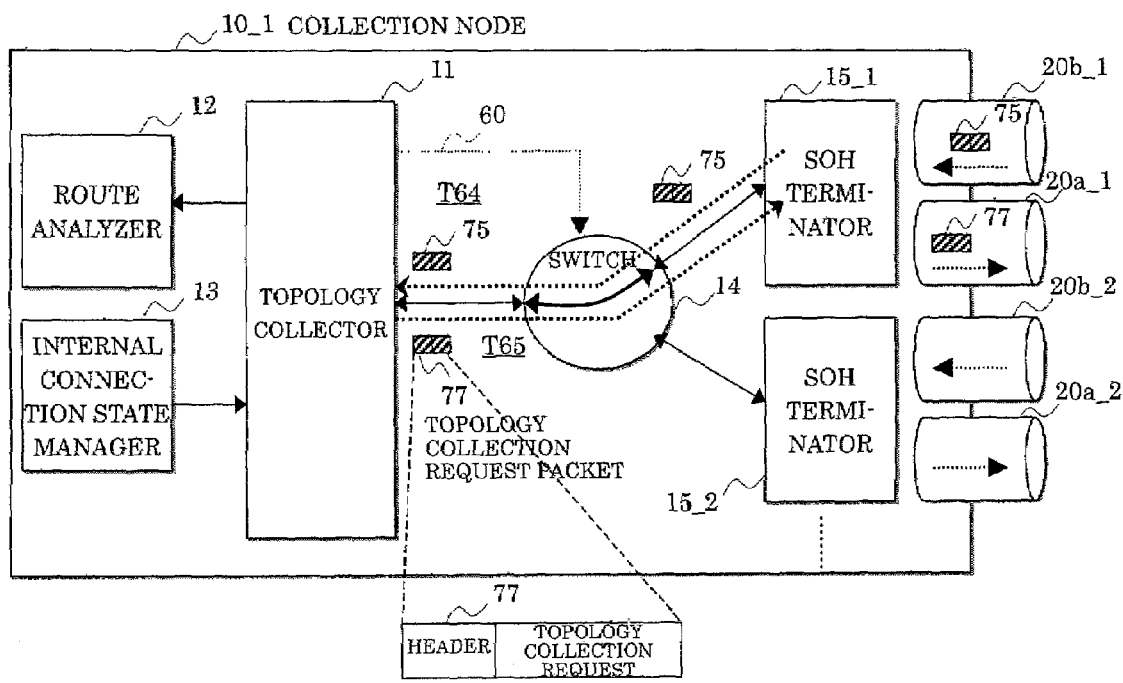
FIG. 39 is a sequence diagram showing an example of an opposed topology information (section data and connect data) acquisition procedure (7) of a remote node in a network topology collection device according to the present invention.

Step T64: In FIG. 39, the switch 14 in the collection node 10_1 transmits the changeover complete packet 75 to the topology collector 11 according to the static switch.

Step T65: After receiving the changeover compete packet 75, the topology collector 11 transmits the topology collection request packet 77 to the switch 14, which transmits the packet 77 according to the static switch.

Figure 40:
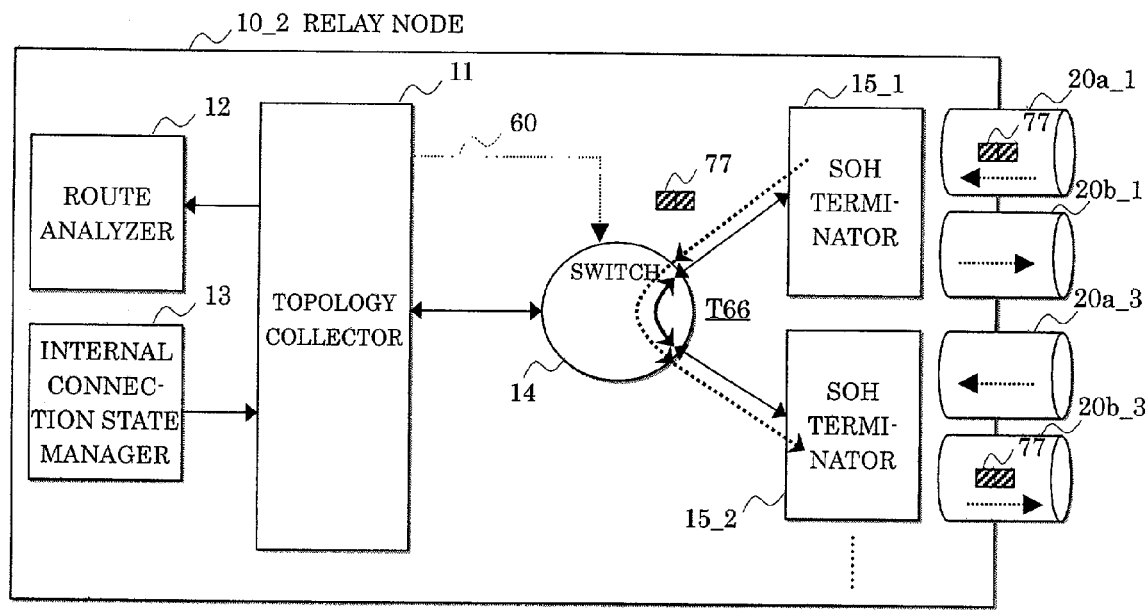
FIG. 40 is a sequence diagram showing an example of an opposed topology information (section data and connect data) acquisition procedure (8) of a remote node in a network topology collection device according to the present invention.

Step T66: In FIG. 40, the switch 14 in the relay node 10_2 transmits the topology collection request packet 77 according to the static switch.

Figure 41:
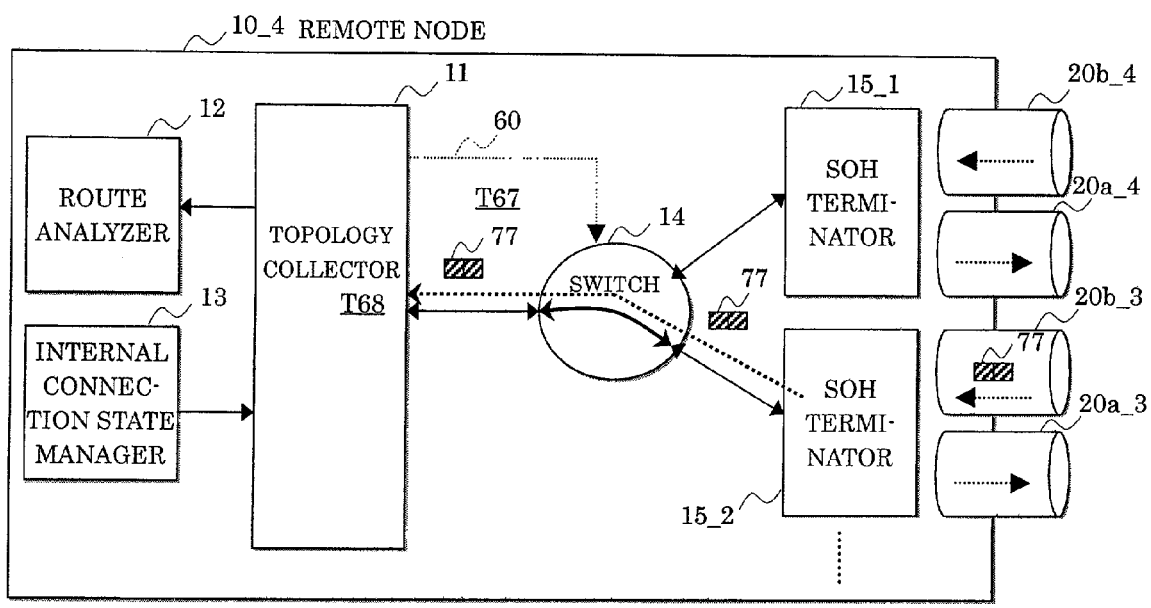
FIG. 41 is a sequence diagram showing an example of an opposed topology information (section data and connect data) acquisition procedure (9) of a remote node in a network topology collection device according to the present invention.

Step T67: In FIG. 41, the switch 14 in the remote node 10_4 transmits the topology collection request packet 77 to the topology collector 11 according to the static switch.

Step T68: The topology collector 11 performs the processing of the topology collection requested by the received topology collection request packet 77. Namely, the topology collector 11 executes the processings shown at steps T11–T20 of FIGS. 22–24, and collects the connect data 83 of the path in the node 10_4 to which the topology collector itself belongs, and the section data 81 of the section mutually connecting the node 10_4 and the opposed node 10.

Figure 42:
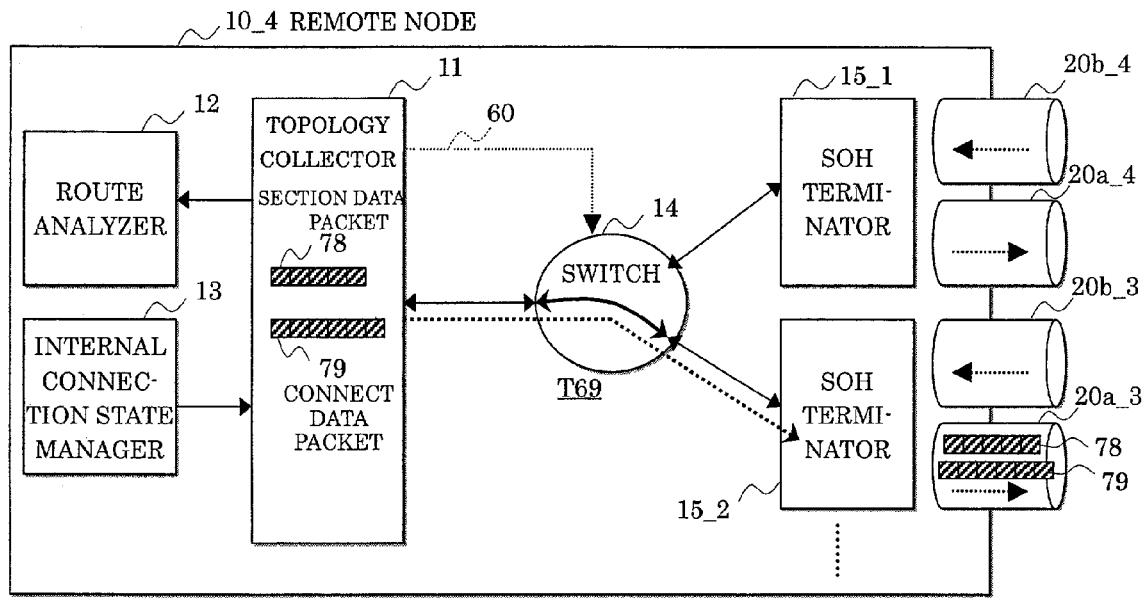
FIG. 42 is a sequence diagram showing an example of an opposed topology information (section data and connect data) acquisition procedure (10) of a remote node in a network topology collection device according to the present invention.

Step T69: In FIG. 42, the topology collector 11 prepares the section data 81, the connect data 83, and the section data packet 78 and the connect data packet 79 into which the respective data are packetted. As many packets 78 and 79 as the section data 81 and the connect data 83 are respectively prepared (see FIG. 29).

The topology collector 11 transmits the prepared section data packet 78 and the connect data packet 79 to the switch 14, which transmits these packets according to the static switch.

Figure 43:
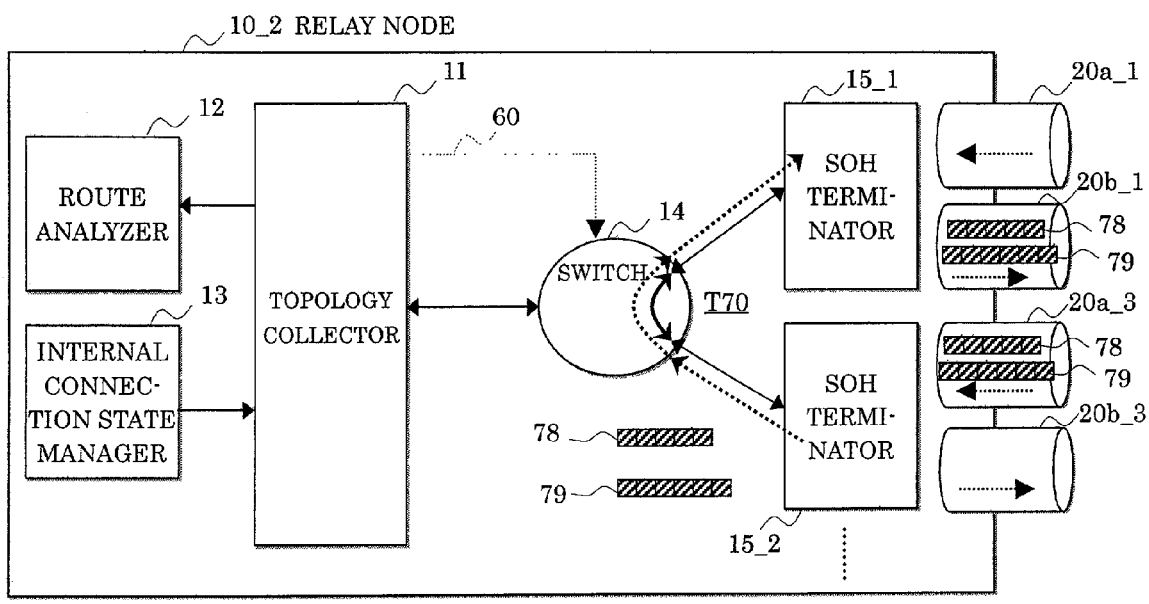
FIG. 43 is a sequence diagram showing an example of an opposed topology information (section data and connect data) acquisition procedure (11) of a remote node in a network topology collection device according to the present invention.

Step T70: In FIG. 43, the section data packet 78 and the connect data packet 79 are transmitted according to the static switch set in the switch 14 to be passed through the relay node 10_2.

Figure 44:
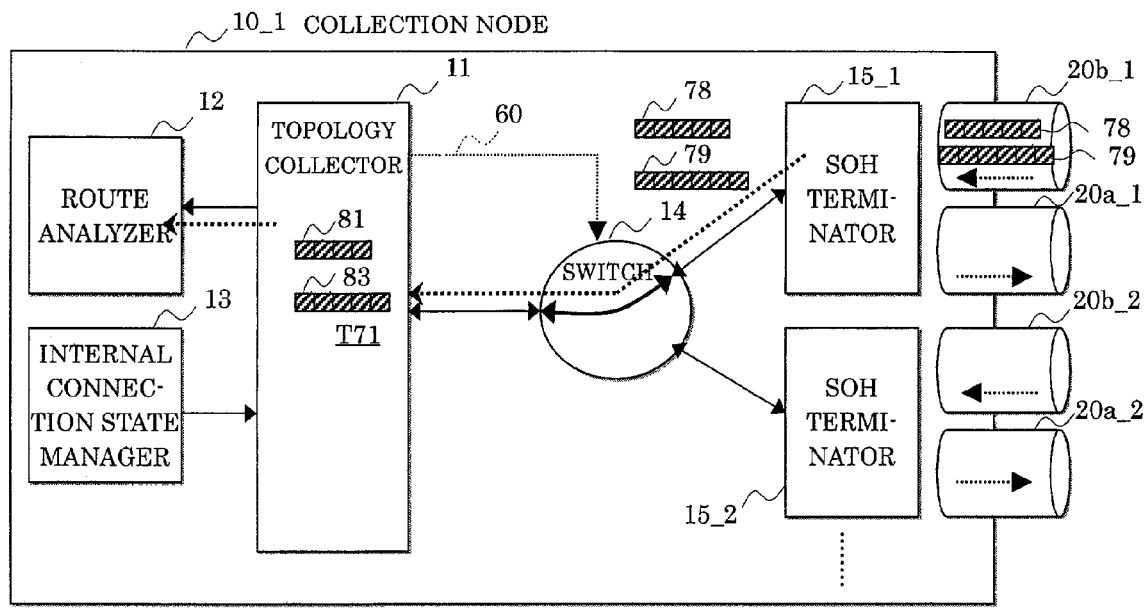
FIG. 44 is a sequence diagram showing an example of an opposed topology information (section data and connect data) acquisition procedure (12) of a remote node in a network topology collection device according to the present invention.
Figure 45:
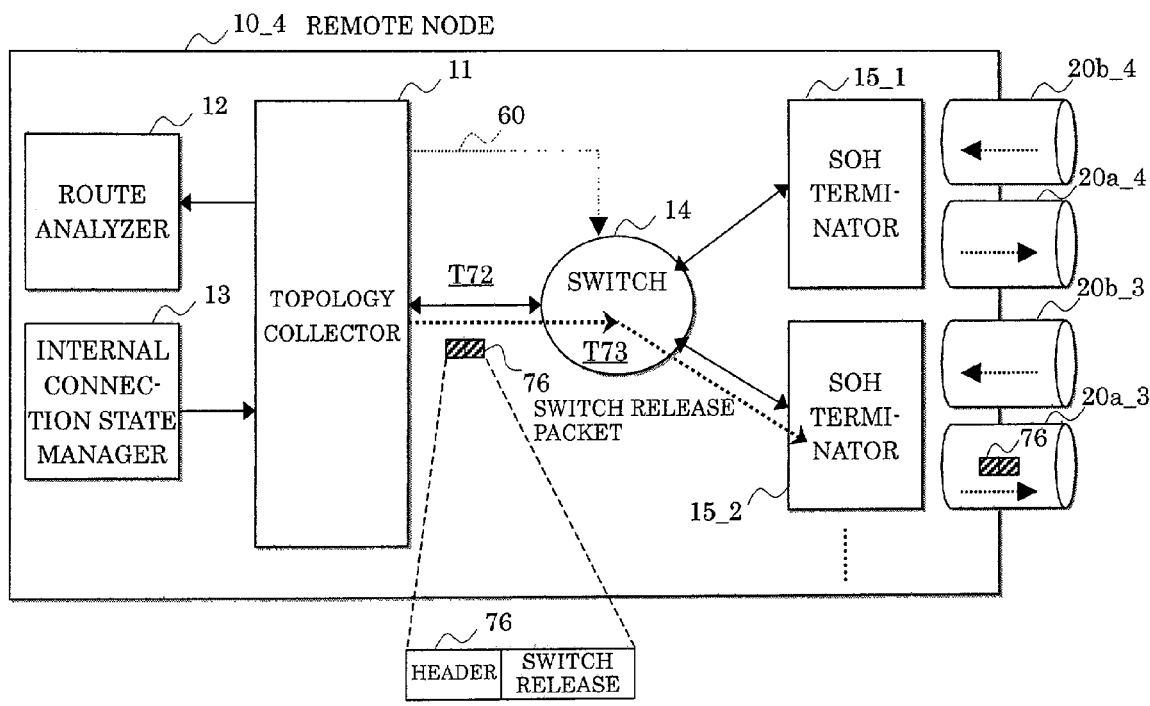
FIG. 45 is a sequence diagram showing an example of an opposed topology information (section data and connect data) acquisition procedure (13) of a remote node in a network topology collection device according to the present invention.

Step T71: In FIG. 44, the switch 14 of the collection node 10_1 transmits the section data packet 78 and the connect data packet 79 to the topology collector 14 according to the static switch.

The topology collector 11 transmits the section data 81 and the connect data 83 obtained by removing the header from the section data packet 78 and connect data packet 79 respectively to the route analyzer 12.

Step T72: On the other hand, in FIG. 45, after completing the transmission of all the section data packet 78 and the connect data packet 79 at step T69, the remote node 10_4 transmits the switch release packet 76 to the switch 14.

Step T73: The switch 14 transmits the switch release packet 76 according to the static switch to release the static switch.

Figure 46:
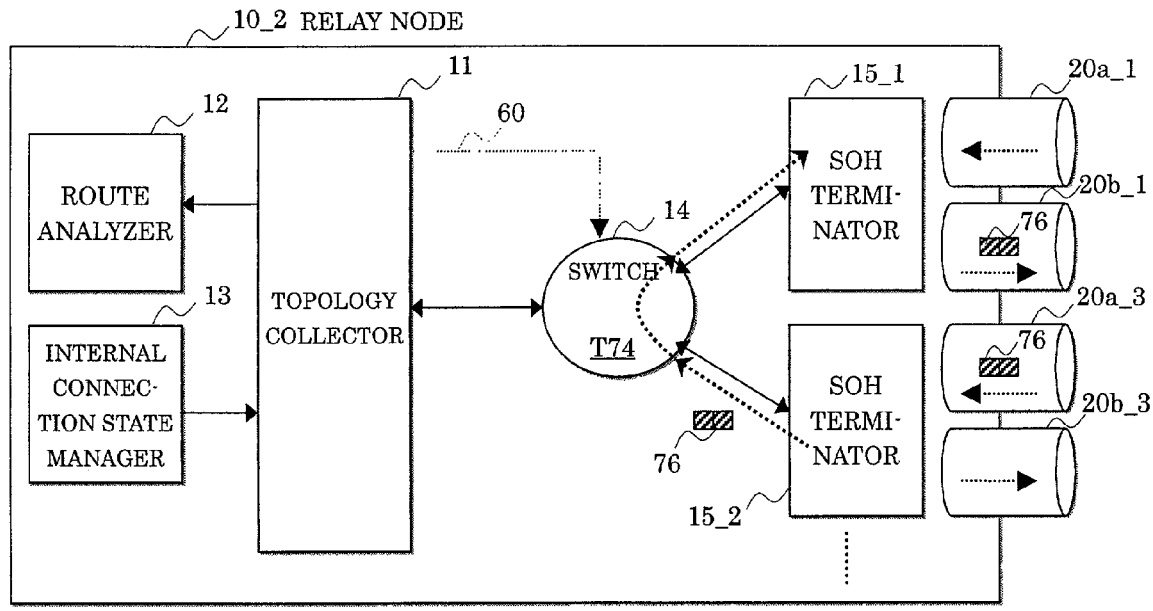
FIG. 46 is a sequence diagram showing an example of an opposed topology information (section data and connect data) acquisition procedure (14) of a remote node in a network topology collection device according to the present invention.

Step T74: In FIG. 46, in the same way as the above-mentioned step T73, the switch 14 in the relay node 10_2 transmits the switch release packet 76 according to the static switch, and then releases the static switch.

Figure 47:
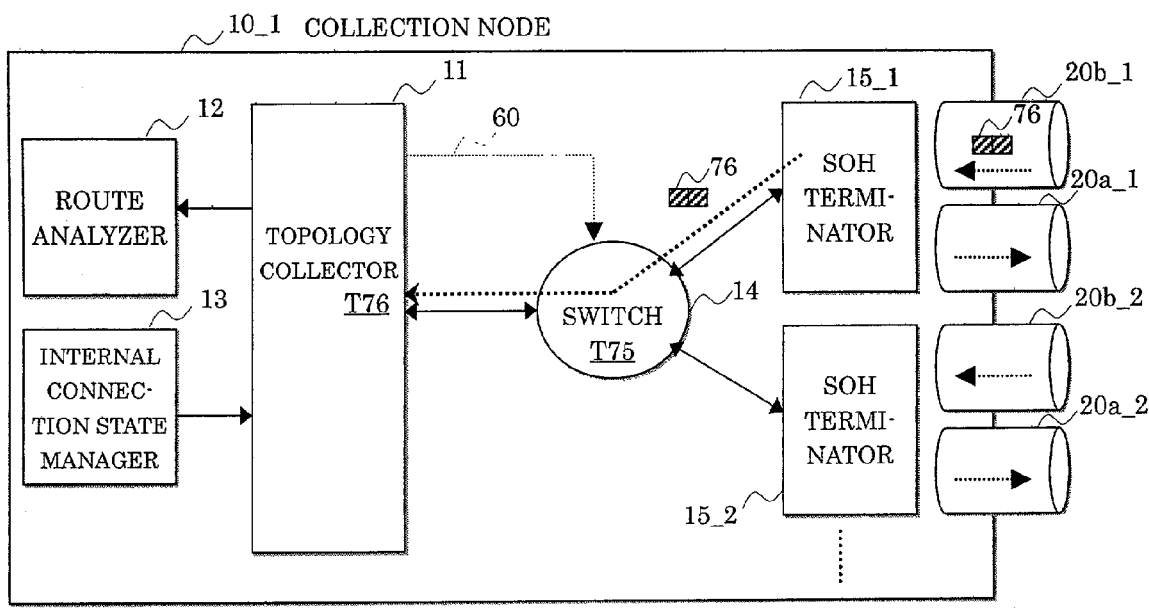
FIG. 47 is a sequence diagram showing an example of an opposed topology information (section data and connect data) acquisition procedure (15) of a remote node in a network topology collection device according to the present invention.

Step T75: In FIG. 47, in the same way as the above-mentioned step T73, the switch 14 in the collection node 10_1 transmits the switch release packet 76 to the topology collector 11 according to the static switch, and then releases the static switch.

Step T76: The topology collector 11 determines whether or not there is the node 10 which does not collect the section data 81 and the connect data 83 based on the collected section data 81 (section opposed topology information 82), and determines the next node 10 to be collected.

Figure 16:
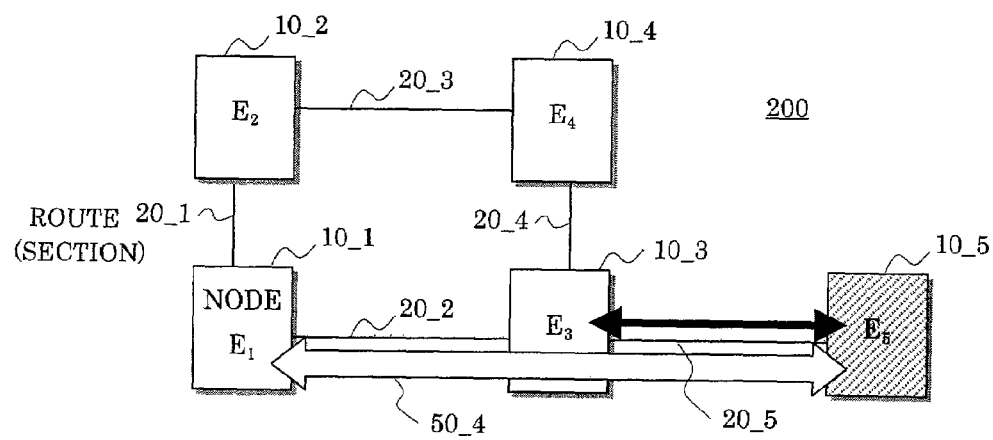
FIG. 16 is a block diagram showing a collection procedure (5) of a network topology in a principle (11) of a network topology collection device according to the present invention.

Hereinafter, the topology collector 11 repeats steps T51–T76, and repeats the collection of the opposed topology information 82 from the node 10 to be collected until any of the nodes 10 collects the opposed topology information 82 (see FIG. 16).

[4] Determination Procedure of Network Topology

Figure 48:
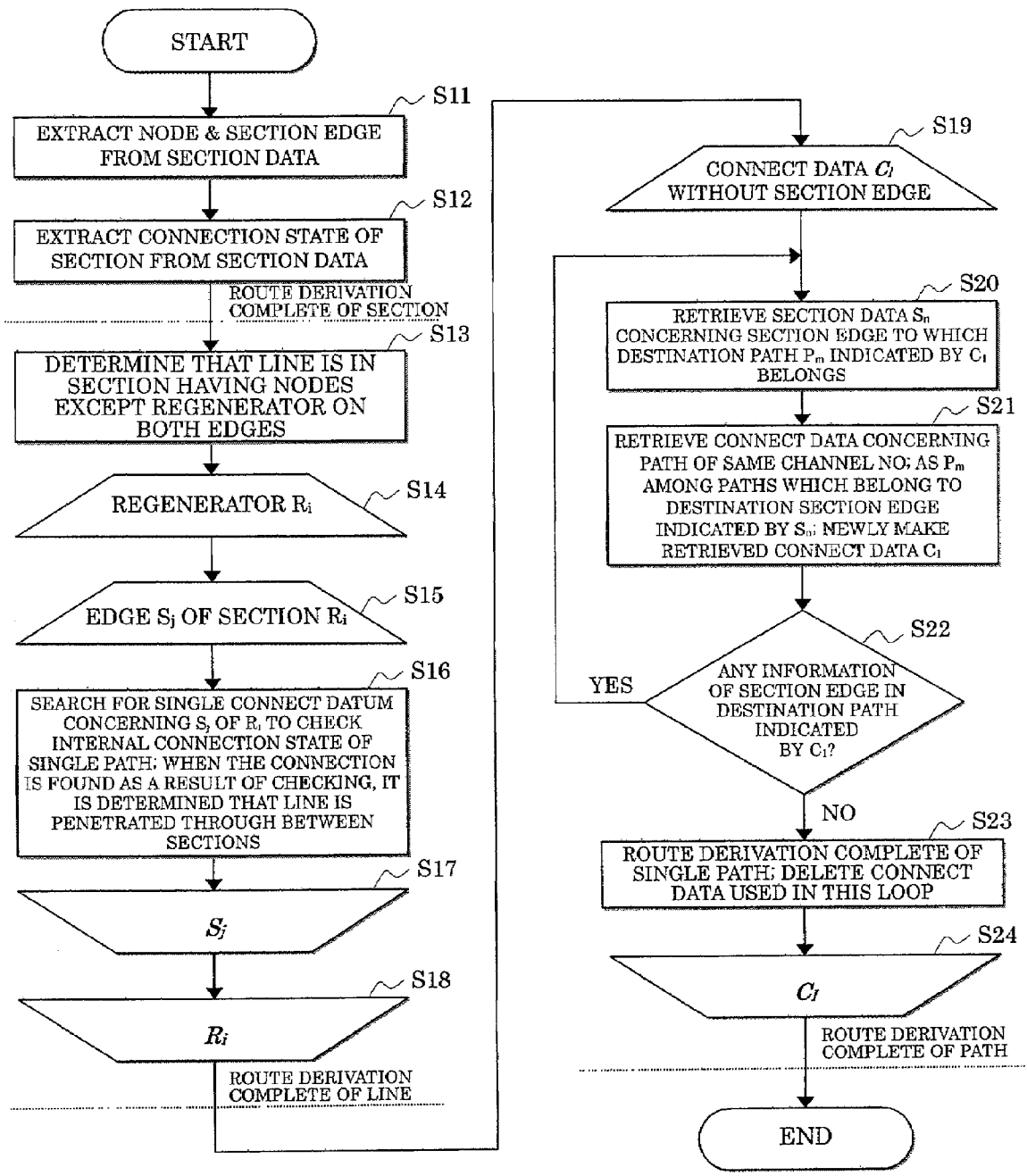
FIG. 48 is a flow chart showing a route analysis procedure example of sections, lines, and paths in a network topology collection device according to the present invention.

FIG. 48 shows a procedure of determining the topology of the entire network based on the opposed topology information 82 (aggregation of section data 81) and the internal connection state information 84 (aggregation of connect data 83) collected by the procedures of FIGS. 22–47. Namely, the route (topology) derivation procedure of the section, the line, and the path from the collected information is shown.

Hereinafter, the route derivation procedure of the section, the line, and the path from the section data 81 and the connect data 83 will be described referring to FIG. 48.

Step S11: The route analyzer 12 searches for all of the section data 81, and extracts all of the pairs of the identifier $E_i$ of the node 10 and the identifier $S_i$ of the section edge (see FIGS. 21D and 21G).

Step S12: The route analyzer 12 searches for all of the section data 81, and derives the connection state of the section 20 between the nodes 10.

The section data 81 collected by the method of the present invention directly represent the connection relationship between the node and the section. Therefore, the route of the section is determined by the processing of the above-mentioned steps S11 and S12.

Step S13: Since the lines are terminated at the nodes except the regenerator, the section whose both edges are the nodes except the regenerator is searched for, and that section is determined to be a route.

Step S14: A single node is selected from among all of the nodes that are regenerators $R_i$, and the processings of steps S15–S17 are performed.

Step S15: The processing of step S16 is performed to the edges $S_j$ of all the sections of the regenerator selected at step S14.

Step S16: In order to check that the section edge selected at step S15 is connected to which part of the regenerator, a single connect datum concerning the path of the section edge is searched for. As a result, the connection state of the line within the regenerator can be analyzed, and the route of the line which passes through the regenerator is derived.

Step S17: Returning to step S15, the processing is performed to the next section edge.

Step S18: Returning to step S14, the processing is performed to the next regenerator.

At the processings of the above-mentioned steps S13–S18, the route (line topology) of the line is determined. Thus, the line topology can be determined based on the information included in another hierarchy, i.e. the section topology or the path topology.

Step S19: The processings of steps S20–S23 are performed to all of the data (data indicating the path edge) without any information of the section edge within connect data $C_1$.

Step S20: From the single connect data $C_1$ selected at step S19, the destination (connecting destination) of a path $P_m$, a section edge $S_n$ is recognized, and the section information of the section edge is searched for.

Step S21: The destination of the section is recognized from the information searched for at step S20, and which the path is connected to is recognized. By searching for the connect data $C_1$ of the node, which the path is further connected to is recognized.

Step S22: If the destination recognized at step S21 indicates the path edge (if the connect data $C_1$ have no information of the section edge), the route derivation of the path is supposed to be completed. On the contrary, if not a path edge, it is recognized that the path is further connected to the next node. Therefore, returning to step S20, the processing continues the route search of the path.

Step S23: When the route search of the path is completed at step S22, the used connect data become unnecessary, so that the data are discarded in order to shorten the retrieval time.

Step S24: Returning to step S19, the processing of the next connect data is performed.

By the processings of the above-mentioned steps S19–S24, the route (path topology) derivation of the path is completed. Thus, the route of the path can be determined based on the information (connect data $C_1$) of the hierarchy of the path and the section data of another hierarchy.

Also, at the above-mentioned steps S11–S24, the topology of the entire network is determined.

It is to be noted that in the above-mentioned embodiment, the case where the node 10_1 is a collection node to determine the topology of the entire network is described. However, it is possible to easily determine the topology of the entire network with another node 10 being made a collection node.

As described above, a network topology collection device according to the present invention is arranged such that the first means demand route connection state information when necessary, and prepare opposed topology information indicating a connection state between a node to which the network topology collection device itself belongs and an opposed node which terminates a route terminated by the former node, the second means collect the opposed topology information of a node directly or indirectly routed to the node to which the network topology collection device itself belongs, and a route analyzer determines a topology of an entire network based on the opposed topology information collected. Therefore, it becomes possible to easily determine the network topology. Also, since the information is transmitted/received only when necessary, a useless transmission/reception of the information can be eliminated.

Also, the network topology collection device according to the present invention is arranged such that an internal connection state manager manages internal connection state information indicating the connection state of the route within the node, and the route analyzer determines the network topology based on the opposed topology information further including the internal connection state information collected. Therefore, it becomes possible to easily determine the network topology.

Also, the network topology collection device according to the present invention is arranged such that in a hierarchized route, the first means prepare the opposed topology information corresponding to a route of each hierarchy, the second means collect the opposed topology information corresponding to the route of each hierarchy, and the route analyzer determines a network topology of a route in a specific hierarchy based on opposed topology information in the hierarchy and opposed topology information of a route in another hierarchy. Therefore, it becomes possible to easily determine the network topology of the hierarchized route with less information amount transmitted/received.

Also, the network topology collection device according to the present invention is arranged such that the information transmitted/received between the nodes is transmitted through the route composing the network. Therefore, such a problem that the network topology can not be determined due to a fault of another route is eliminated.

Furthermore, by setting the network topology collection device according to the present invention in the node composing the SDH/SONET basic transmission system, it becomes possible for the collection device to determine the network topology respectively corresponding to the section, the line, and the path in an arbitrary node, and to notify the determination to operators.

What we claim is:

1. A network topology collection device comprising:
   first means for demanding, from an opposed node which terminates a route which is an SDH or SONET link terminated by a node to which the network topology collection device itself belongs, route connection state information indicating a connection state of the route, and for preparing opposed topology information based on responded route connection state information; and
   second means for collecting opposed topology information of a node directly or indirectly routed to the node to which the network topology collection device itself belongs,
   wherein the route connection state information comprises an identifier of the opposed node and an identifier of an edge of the opposed node side of the route, and the opposed neighborhood topology information comprises an aggregation aggregating route data, composed of identifiers of both terminal edges of a route and identifiers of terminal nodes which comprise terminal edges which respectively terminate the both terminal edges of said route, for all of the routes terminated by the node to which the network topology collection device itself belongs.

2. The network topology collection device as claimed in claim 1, further comprising:
   an internal connection state manager for managing internal connection state information indicating the connection state of the route within the node to which the network topology collection device itself belongs, wherein
   the second means collecting the opposed topology information further including internal connection state information within the node directly or indirectly routed to the node to which the network topology collection device itself belongs.

3. The network topology collection device as claimed in claim 2 wherein the internal connection state information comprises an aggregation aggregating route connect data, for all pairs of a first and a second route connected within the node, composed of an identifier of a node, identifiers of a first and a second route connected within the node, and identifiers of a third and a fourth route including the first and the second route, wherein the identifiers of the first and second route are of the same hierarchy level of the multiplexed route and the identifiers of the third and a fourth route are of the same hierarchy level of the multiplexed route in another multiplexed route.

4. The network topology collection device as claimed in claim 2 wherein the route is multiplexed, and
   the first means prepare opposed topology information corresponding to a route in at least one hierarchy level of the multiplexed route at the node to which the network topology collection device itself belongs, and the second means collect opposed topology information corresponding to the route in at least one hierarchy level of the multiplexed route.

5. The network topology collection device as claimed in claim 4, further comprising a route analyzer for determining a topology of an entire network based on the opposed topology information.

6. The network topology collection device as claimed in claim 2 wherein the node has a switch, and the second means transmit a switch control signal for switching over the switch of the node to which the network topology collection device itself belongs, a switch of a relay node, or a switch of a collecting destination node, and establish a transmission line for transmitting the opposed topology information.

7. The network topology collection device as claimed in claim 6 wherein the information transmitted/received between the nodes is transmitted through the route.

8. The network topology collection device as claimed in claim 1 wherein the route is multiplexed, and
   the first means prepare opposed topology information corresponding to a route in at least one hierarchy of the multiplexed routes at the node to which the network topology collection device itself belongs, and the second means collect opposed topology information corresponding to the route in at least one hierarchy of the multiplexed routes.

9. The network topology collection device as claimed in claim 8 wherein the internal connection stare manager determines the internal connection state information based on a function of each node.

10. The network topology collection device as claimed in claim 1, further comprising a route analyzer for determining a topology of an entire network based on the opposed topology information.

11. The network topology collection device as claimed in claim 10 wherein the route analyzer determines a network Topology of a route including a first hierarchy of multiplexed routes in a multiplexed route based on opposed topology information in the hierarchy of the multiplexed route and opposed topology information of each route in a second hierarchy of the multiplexed routes.

12. The network topology collection device as claimed in claim 11 wherein in presence of a node which does not terminate the route in the first hierarchy of the multiplexed route the route analyzer determines the topology of the route of the first hierarchy of the multiplexed route based on opposed topology information of the route in a second hierarchy of the multiplexed routes included in the route in the multiplexed route.

13. The network topology collection device as claimed in claim 11 wherein the route analyzer determines the topology of the route in the first hierarchy of the multiplexed route based on internal connection stare information of the route of the multiplexed route and opposed topology information of a route in a second hierarchy of a multiplexed route including the route in the specific multiplexed route.

14. The network topology collection device as claimed in claim 13 wherein the internal connection state information comprises internal connection state information of a virtual route in the first hierarchy of the multiplexed route.

15. The network topology collection device as claimed in claim 1 wherein the node has a switch, and the second means transmit a switch control signal for switching over the switch of the node to which the network topology collection device itself belongs, a switch of a relay node, or a switch of a collecting destination node, and establish a transmission line for transmitting the opposed topology information.

16. The network topology collection device as claimed in claim 15 wherein the node and the route compose an SDH/SONET network, and the second means establish the transmission line by using an unused area of a section overhead of an SDH/SONET.

17. The network topology collection device as claimed in claim 1 wherein the information transmitted/received between the nodes is transmitted through the route.

18. The network topology collection device as claimed in claim 1 wherein the second means recognize a node connected to a network based on the opposed topology information covered, and repeat a collection of opposed topology information until any of recognized nodes collects opposed topology information.

* * * * *